US010104249B2

(12) United States Patent
Nishio

(10) Patent No.: US 10,104,249 B2
(45) Date of Patent: Oct. 16, 2018

(54) INFORMATION PROCESSING APPARATUS USING A PLURALITY OF SETTING SCREENS, INFORMATION PROCESSING METHOD USING THE SAME, AND INFORMATION PROCESSING SYSTEM USING THE SAME

(71) Applicant: Masahide Nishio, Kanagawa (JP)

(72) Inventor: Masahide Nishio, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/702,157

(22) Filed: Sep. 12, 2017

(65) Prior Publication Data
US 2018/0077305 A1 Mar. 15, 2018

(30) Foreign Application Priority Data

Sep. 15, 2016 (JP) .................. 2016-180199
Nov. 8, 2016 (JP) .................. 2016-217773

(51) Int. Cl.
G06F 3/12 (2006.01)
H04N 1/00 (2006.01)

(52) U.S. Cl.
CPC ..... *H04N 1/00503* (2013.01); *H04N 1/00244* (2013.01); *H04N 1/00474* (2013.01); *H04N 1/0044* (2013.01); *H04N 1/00941* (2013.01); *H04N 2201/001* (2013.01); *H04N 2201/0094* (2013.01)

(58) Field of Classification Search
None
See application file for complete search history.

(56) References Cited

U.S. PATENT DOCUMENTS

| 8,274,677 | B2 | 9/2012 | Asano |
| 8,356,084 | B2 | 1/2013 | Yamamoto |
| 9,544,454 | B2* | 1/2017 | Kishida ............... H04N 1/00474 |
| 2015/0286451 | A1* | 10/2015 | Armstrong ............ G06F 3/1205 358/1.15 |

(Continued)

FOREIGN PATENT DOCUMENTS

| JP | 2006-238199 | 9/2006 |
| JP | 5137641 | 2/2013 |
| JP | 2016-035658 | 3/2016 |

*Primary Examiner* — Dung D Tran
(74) *Attorney, Agent, or Firm* — IPUSA, PLLC

(57) ABSTRACT

An information processing apparatus executes a first program to display a first print setting screen; and executes a second program to display a second print setting screen that is different from the first print setting screen. The executing of the first program includes displaying the first print setting screen; accepting a first changing operation of changing setting information of a function relating to a printing operation, at the displayed first print setting screen; and storing the changed setting information in a shared storage that is accessible by the second program, in response to accepting the first changing operation. The executing of the second program includes acquiring the setting information from the shared storage; and displaying the second print setting screen based on the acquired setting information, such that the first changing operation performed at the first print setting screen is applied to the second print setting screen.

18 Claims, 35 Drawing Sheets

(56) References Cited

U.S. PATENT DOCUMENTS

| | | | |
|---|---|---|---|
| 2016/0077770 A1* | 3/2016 | Morita ................. | G06F 3/1253 358/1.15 |
| 2016/0127584 A1* | 5/2016 | Kubota ............. | H04N 1/00408 358/1.15 |
| 2016/0162226 A1* | 6/2016 | Suzuki ................. | G06F 3/1225 358/1.15 |
| 2016/0162235 A1* | 6/2016 | Saigusa ................ | G06F 3/1256 358/1.15 |

* cited by examiner

```
{
  "orientation" : "PAPER ORIENTATION",
  "printsize" : "PAPER SIZE",
  "copies" : "NUMBER OF COPIES",
  ...
}
```

FIG.8

```
{
  "type" : "Gui::ComboBox",
  "name" : "colorbw",
  "params" : {
     "x":255, "y":189, "width":143
  }
},
{
  "type" : "Gui::SpinBox",
  "name" : "copies",
  "params" : {
     "x":45, "y":234, "width":62
  }
},
  ...
```

```
{
  "name" : "2in1 landscape",
  "comment" : "test",
  "settings" : {
    "orientation" : "landscape",
    "nup": "2in1"
  }
}
```
~1300

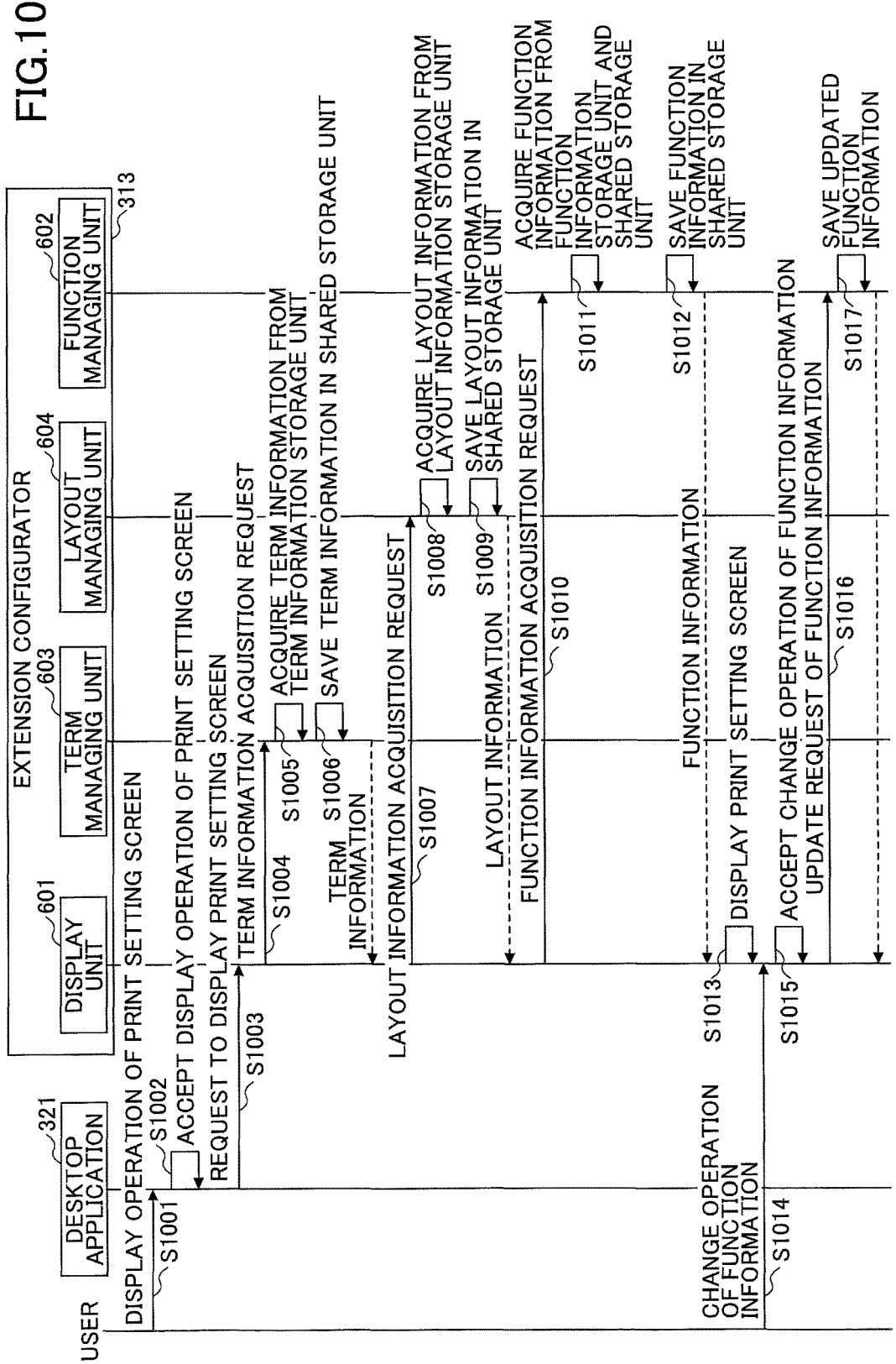

FIG.11

PRINT SETTING

FREQUENTLY USED SETTINGS | SETTINGS PER ITEM | INITIAL SETTING/VERSION

PRESENT SETTING
[STANDARD SETTING]

ORIGINAL DOCUMENT SIZE: A4 (210×297 mm)
PRINT PAPER SIZE: SAME AS ORIGINAL DOCUMENT SIZE
MAGNIFICATION: PAPER SPECIFICATION MAGNIFICATION

REGISTER IN SIMPLE SETTING (R)...

SETTING SET LIST (O):
- STANDARD SETTING
- AGGREGATE
- DOUBLE-SIDED
- AGGREGATE (DOUBLE-SIDED)

EDIT SETTING SET

PRINTING METHOD (J): REGULAR PRINTING    DETAILS (D)...

ORIGINAL DOCUMENT SIZE (D): A4 (210×297 mm)

ORIGINAL DOCUMENT ORIENTATION:
● VERTICAL (P)  ○ HORIZONTAL (L)

PRINT PAPER SIZE (P): SAME AS ORIGINAL DOCUMENT SIZE

SHEET FEEDING TRAY (I): AUTOMATIC TRAY SELECTION

PAPER TYPE (P): PLAIN PAPER/RECYCLED PAPER

AGGREGATE TO 1 PAGE (L): NO

ARRANGEMENT OF PAGES (P):

DOUBLE-SIDED (2): NO

BOOK BINDING (B): NO

ARRANGEMENT OF PAGES (P): LEFT-OPENING/UPWARD OPENING

STAPLE (S): NO

PUNCH (P): NO

COLOR/MONOCHROME (C): COLOR

NUMBER OF COPIES (C): (1 TO 999) 1

OK | CANCEL | APPLY (A) | HELP

G100, G110, G120

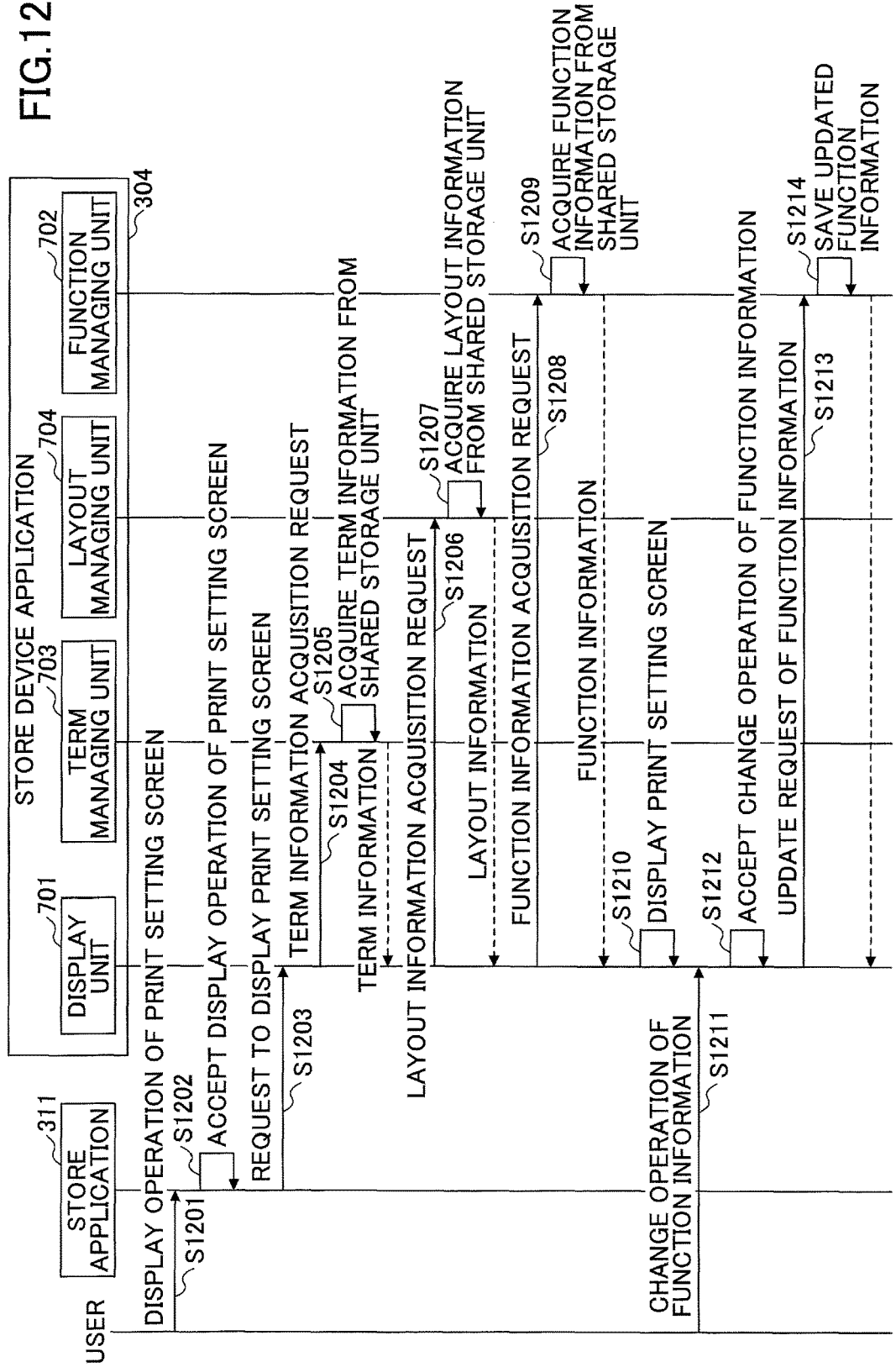

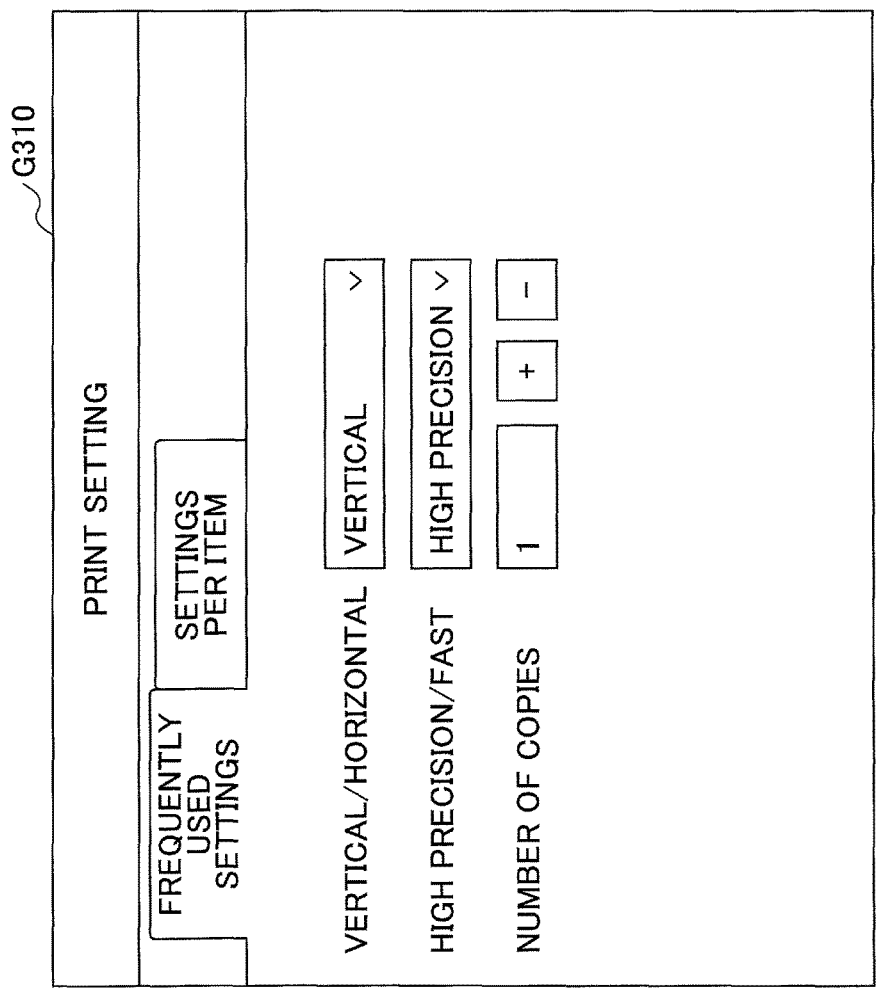

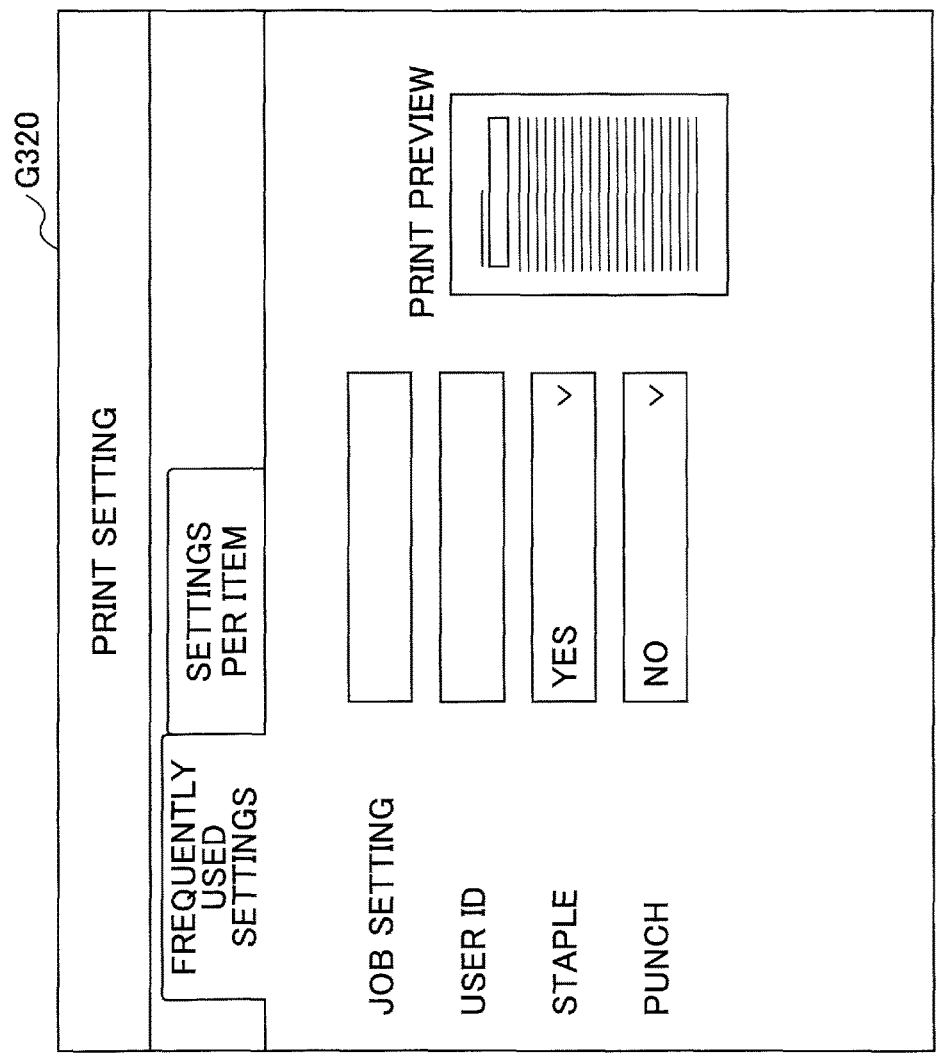

FIG.31

```
{
  "ver1.0":[
    "RENDERING METHOD 1":[····],
    "RENDERING METHOD 2":[····],
    "RENDERING METHOD 3":[····]
  ],
  "ver.1.1" :[
    "RENDERING METHOD 4":[····]
  ]
}
```

4100

US 10,104,249 B2

INFORMATION PROCESSING APPARATUS USING A PLURALITY OF SETTING SCREENS, INFORMATION PROCESSING METHOD USING THE SAME, AND INFORMATION PROCESSING SYSTEM USING THE SAME

CROSS-REFERENCE TO RELATED APPLICATION

The present application claims priority under 35 U.S.C. § 119 to Japanese Patent Application No. 2016-180199, filed on Sep. 15, 2016 and Japanese Patent Application No. 2016-217773, filed on Nov. 8, 2016, the contents of which are incorporated herein by reference in their entirety.

BACKGROUND OF THE INVENTION

1. Field of the Invention

The present invention relates to an information processing apparatus, an information processing method, and an information processing system.

2. Description of the Related Art

In the Windows Operating System (OS) on and subsequent to Windows (registered trademark) 8, two types of user interfaces (UI) are adopted; namely, a UI used for a desktop application and a UI used for a store application. Hereinafter, the UI used for the desktop application is referred to as "desktop UI", and the UI used for the store application is referred to "store application UI".

Furthermore, with the Version 4 printer driver, which is the architecture of the printer driver adopted in the Windows OS on and subsequent to Windows 8, a print setting screen specific to a vendor (vender-specific print setting screen) can be displayed by both the desktop UI and the store application UI.

Here, the vender-specific print setting screen in the desktop UI can be displayed by the Version 4 printer supporting a module referred to as PrinterExtensions. Furthermore, the vender-specific print setting screen in the store application UI can be displayed by the Version 4 printer supporting a module referred to as a store device application (DCA: Device Companion Application).

In the Version 4 printer driver, there is a known technique capable of applying customization of print settings to both PrinterExtensions and the store device application (see, for example, Patent Document 1).

Here, in the print setting screen, in addition to making print settings (for example, the document size, double-sided/single-sided, and aggregate number, etc.), it is possible to set various functions that the user can add, change, or delete. For example, in the print setting screen, it is possible to set a "setting set" in which a plurality of print settings can be registered as a single set, and to set an image used for a watermark, etc.

Patent Document 1: Japanese Unexamined Patent Application Publication No. 2016-35658

SUMMARY OF THE INVENTION

An aspect of the present invention provides an information processing apparatus, an information processing method, and an information processing system, in which one or more of the disadvantages of the related art are reduced.

According to one aspect of the present invention, there is provided an information processing apparatus including a processor, in communication with a memory, executing a process including executing a first program configured to display a first print setting screen on a display device; and executing a second program configured to display a second print setting screen that is different from the first print setting screen, on the display device, wherein the executing of the first program includes displaying the first print setting screen; accepting a first changing operation of changing setting information of a function relating to a printing operation, at the displayed first print setting screen, the first changing operation being input via a user interface; and storing the changed setting information in a shared storage that is accessible by the second program, in response to accepting the first changing operation, and wherein the executing of the second program includes acquiring the setting information from the shared storage; and displaying the second print setting screen based on the acquired setting information, such that the first changing operation performed at the first print setting screen is applied to the second print setting screen.

BRIEF DESCRIPTION OF THE DRAWINGS

FIG. 7 illustrates an example of term information according to the first embodiment of the present invention;

FIG. 8 illustrates an example of layout information according to the first embodiment of the present invention;

FIG. 9 illustrates an example of function information according to the first embodiment of the present invention;

FIG. 10 is a sequence diagram of an example of a process in which the print setting screen (desktop UI) is displayed and subsequently the function information is changed according to the first embodiment of the present invention;

FIG. 11 illustrates an example of a print setting screen (desktop UI) according to the first embodiment of the present invention;

FIG. 12 is a sequence diagram of an example of a process in which the print setting screen (store application UI) is displayed and subsequently the function information is changed according to the first embodiment of the present invention;

FIGS. 27A and 27B illustrate examples of the print setting screen (store application UI) according to the fifth embodiment of the present invention;

FIG. 31 illustrates an example of rendering method information according to the sixth embodiment of the present invention;

DETAILED DESCRIPTION OF THE PREFERRED EMBODIMENTS

In the related art, for example, after installing the printer driver and the store device application, the settings of various functions cannot be applied to both the PrinterExtensions and the store device application.

A problem to be solved by an embodiment of the present invention is to enable the sharing of functional settings between different print setting screens.

In the following, embodiments of the present disclosure are described in detail by referring to the accompanying drawings.

<System Configuration>

Figure 1:
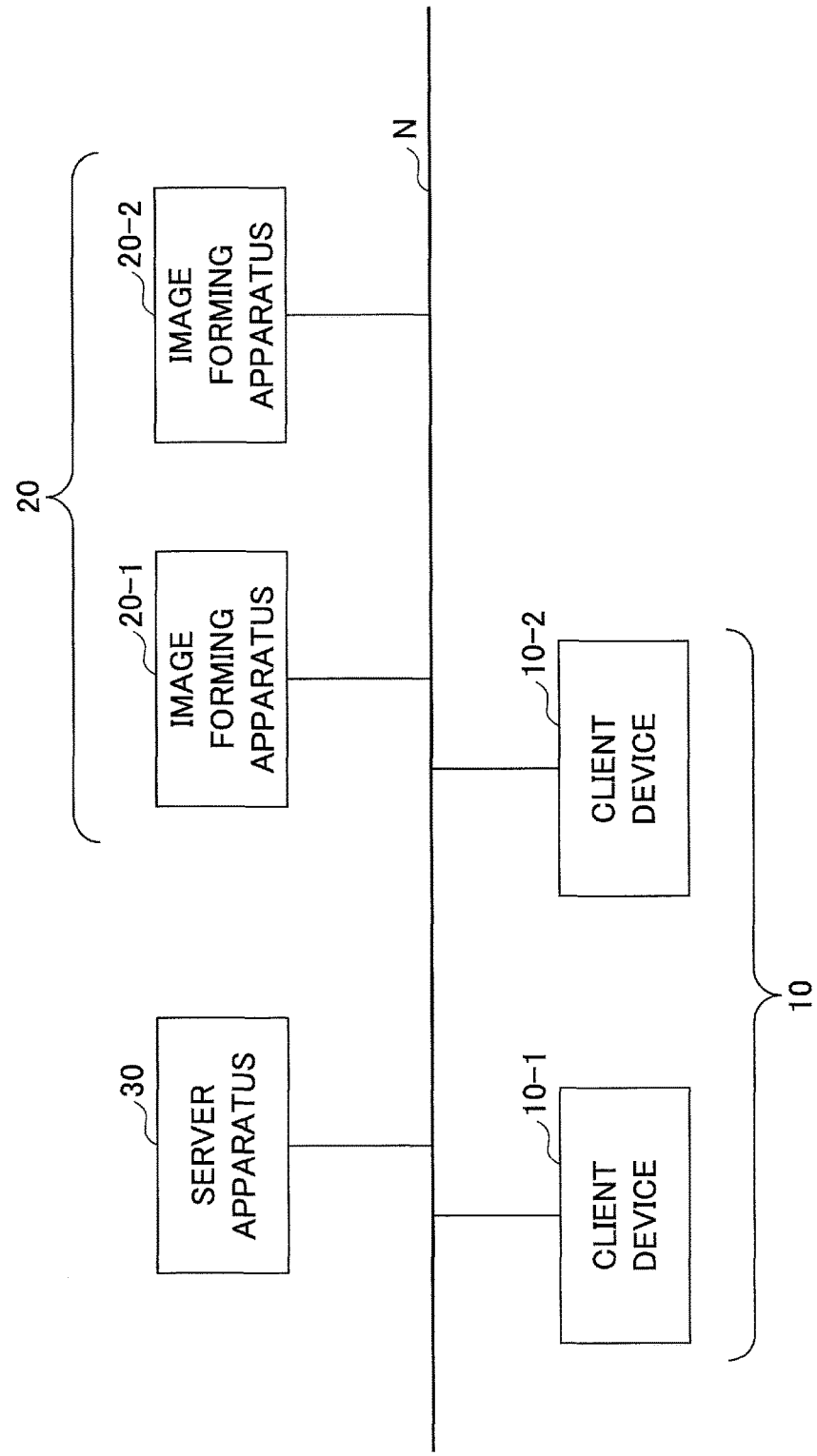
FIG. 1 is a diagram illustrating a system configuration of an example of an information processing system according to an embodiment of the present invention.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (Local Area Network), so that these devices can communicate each other.

The client device 10 may be, for example, a personal computer (PC), a smartphone, or a tablet terminal. Upon receiving, for example, a print instruction from a user, the client device 10 creates print data from data to be printed (print target data), and the client device 10 transmits the print data to the image forming apparatus 20. Alternatively, upon receiving, for example, a print instruction from a user, the client device 10 transmits print target data to the server apparatus 30.

Note that the print target data is, for example, printable electronic data, such as image data and document data. Furthermore, the print data is, for example, electronic data obtained by converting the print target data into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from print target data received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2," for example. Similarly, when the one or more image forming apparatuses 20 are to be distinguished from each other, the one or more image forming apparatuses 20 may be denoted as "image forming apparatus 20-1" and "image forming apparatus 20-2," for example.

<Hardware Configuration>

Figure 2:
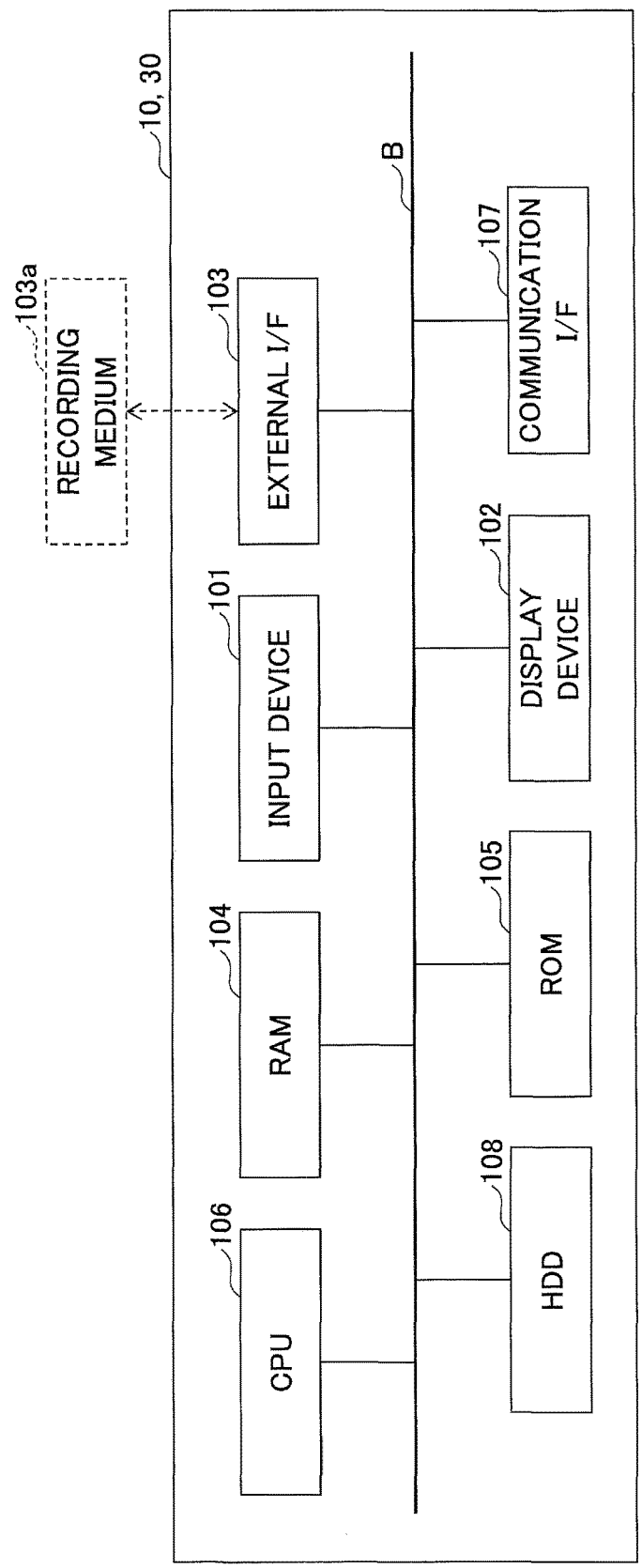
FIG. 2 is a diagram illustrating a hardware configuration of an example of each of a client device and a server apparatus according to an embodiment of the present invention.
Figure 3:
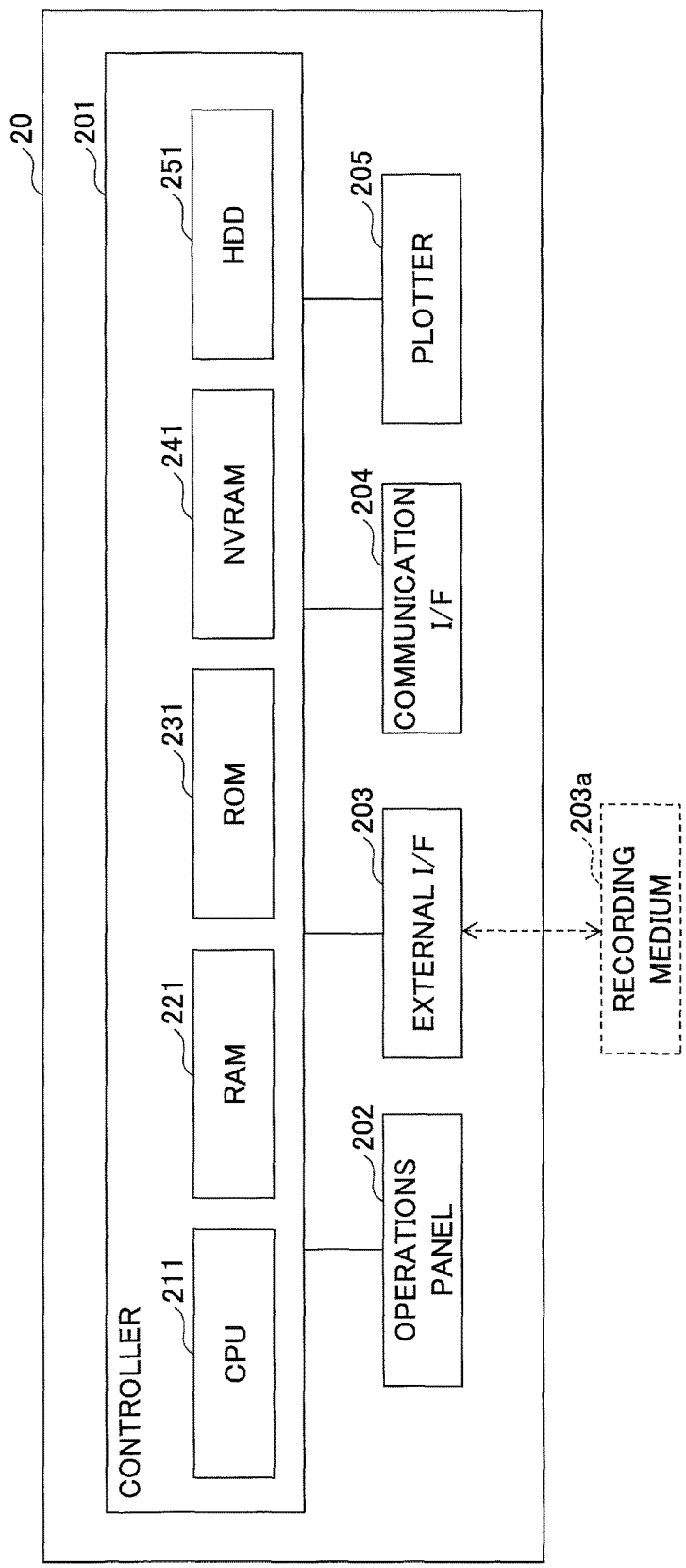
FIG. 3 is a diagram illustrating a hardware configuration of an example of an image forming apparatus according to an embodiment of the present invention.

Next, hardware configurations of the client device 10, the image forming apparatus 20, and the server apparatus 30 that are included in the information processing system 1 according to the embodiment are described by referring to FIG. 2 and FIG. 3.

<<The Client Device 10 and the Server Apparatus 30>>

FIG. 2 is a diagram illustrating hardware configurations of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external I/F 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

<<The Image Forming Apparatus 20>>

FIG. 3 is a diagram illustrating a hardware configuration of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, setting information. Furthermore, the HDD 251 is a non-volatile storage device that stores various types of programs and data.

The CPU 211 is a processor that implements overall control and other functions of the image forming apparatus 20 by reading out a program, data, setting information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, and a Universal Serial Bus (USB) memory.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
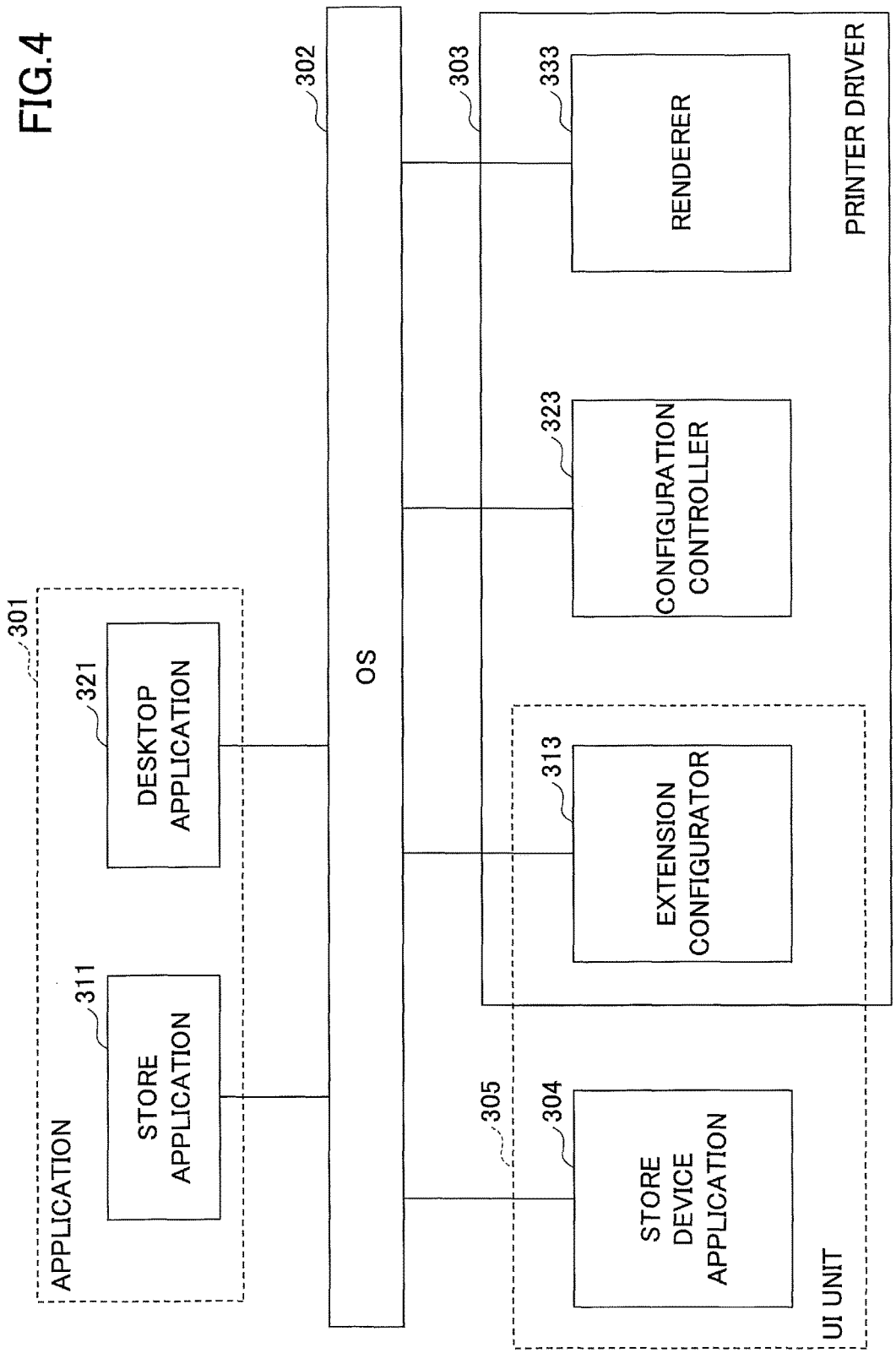
FIG. 4 is a diagram illustrating a software configuration of an example of the client device according to an embodiment of the present invention.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; and a store device application 304.

The application 301 is application software, such as document creation software, image browsing/editing software, and a browser, that is capable of indicating the OS 302 to print, in response to receiving a print instruction from a user. The application 301 includes a store application 311 and a desktop application 321.

The store application 311 is, for example, an application that is available from "Windows Store" that provides applications to Windows (registered trademark) 8/Windows RT and Windows OSs on and subsequent to Windows 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI."

The desktop application 321 is, for example, an application that can be used with an Windows OS on and prior to Windows 7.

The OS 302 is one of the Windows OSs on and subsequent to Windows 8/Windows RT.

The printer driver 303 is, for example, a Version 4 printer driver (which is denoted as "V4 printer driver," hereinafter). A V4 printer driver is based on an architecture adopted from Windows 8/Windows RT. In the following, the printer driver 303 may also be denoted as "V4 printer driver 303".

Note that, in Windows OS on and subsequent to Windows 8, the V4 printer driver can be used, in addition to the Version 3 printer driver (which is denoted as "V3 printer driver" hereinafter), which has been used from Windows 2000 through Windows 7.

The printer driver 303 includes an extension configurator 313; a configuration controller 323; and a renderer 333.

The extension configurator 313 may also be referred to as a printer extension. In response to detecting that the desktop application 321 executes printing, the extension configurator 313 displays a print setting screen specific to a vendor.

The configuration controller 323 may also be referred to as a line-breaking script. For example, the configuration controller 323 verifies whether a combination of print configurations is valid. For example, the extension configurator 313 may hide a combination of print configurations that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from DevmodePropertyBag, configuration values of respective functions configured in the printer driver 303, and the configuration controller 323 returns PrintTicket indicating the retrieved configuration values. Additionally, the configuration controller 323 stores the configuration values indicated by PrintTicket in DevmodePropertyBag.

Note that PrintCapability and PrintTicket returned to the OS 302 are used, for example, for displaying current values of respective functions and choices in the print setting screen displayed by the extension configurator 313.

In response to detecting, by the application 301, that a print instruction for printing the print target data is received, the renderer 333 creates print data from the print target data.

Upon detecting that the store application 311 is to perform printing, the store device application 304 displays a print setting screen specific to a vendor. Note that, similar to the store application 311, the store device application 304 is available from "Windows store".

Upon detecting that the desktop application 321 is to perform printing, the printer driver 303 may create print data based on the details of the configuration that are made in the print setting screen displayed by the extension configurator 313. In contrast, upon detecting that the store application 311 is to perform printing, the printer driver 303 may create print data based on the details of the configuration that are made in the print setting screen displayed by the store device application 304.

The extension configurator 313 and the store device application 304 form a UI unit 305 for displaying a print setting screen specific to a vendor.

<Storage Area that can be Accessed by the V4 Printer Driver 303 and the Store Device Application 304>

Figure 5:
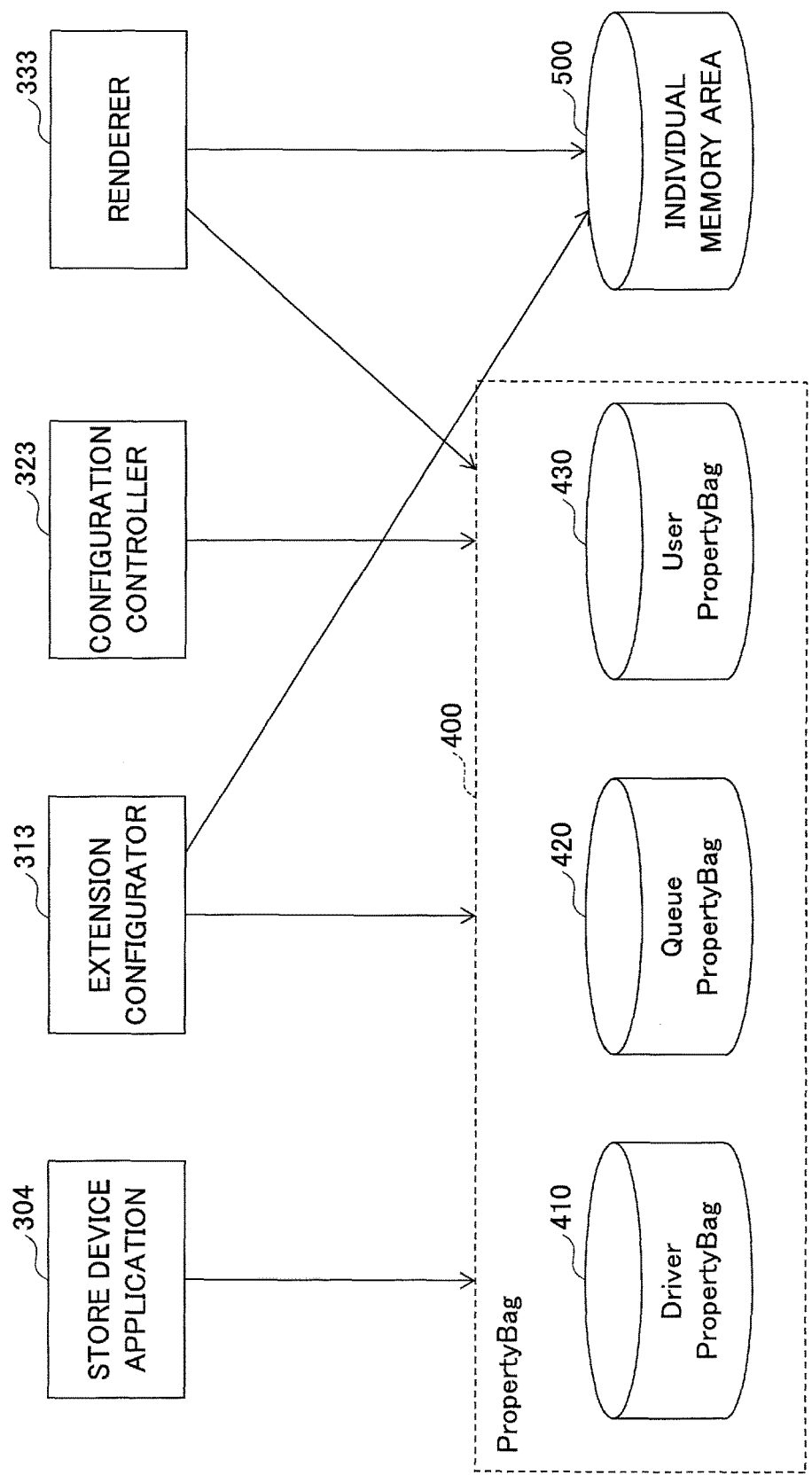
FIG. 5 is a diagram illustrating a storage area accessible by a V4 printer driver and a store device application according to an embodiment of the present invention.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as PropertyBag 400. Note that, such access to the storage area can be executed using an Application Programming Interface (API) provided by the OS 302.

As illustrated in FIG. 5, the PropertyBag 400 includes a DriverPropertyBag 410; a QueuePropertyBag 420; and a UserPropertyBag 430.

The DriverPropertyBag 410 is a storage area for storing setting information that is determined upon creating the V4 printer driver 303. The extension configurator 313, the configuration controller 323, the renderer 333, and the store device application 304 are capable of reading out various types of information from the DriverPropertyBag 410. However, the extension configurator 313, the configuration controller 323, the renderer 333, and the store device application 304 are incapable of writing information in the DriverPropertyBag 410.

The QueuePropertyBag 420 is a storage area for storing setting information for each logical printer (printer icon). The extension configurator 313 and the store device application 304 are capable of reading out various types of information from and writing various types of information in the QueuePropertyBag 420. Furthermore, the configuration controller 323 and the renderer 333 are capable of reading out various types of information from the QueuePropertyBag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The UserPropertyBag 430 is a storage area that stores, for each logical printer, setting information for each user. The extension configurator 313, the configuration controller 323, and the store device application 304 are capable of reading out various types of information from and writing various types of information in the UserPropertyBag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the PropertyBag 400. The individual memory area 500 is defined by a vendor that provides the V4 printer driver 303.

Due to the restriction applied by the OS 302, the store device application 304 is incapable of accessing a storage area other than the PropertyBag 400. Furthermore, the configuration controller 323 is incapable of accessing a storage area other than the DevmodePropertyBag and the PropertyBag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

First Embodiment

<Functional Configuration—First Embodiment>

Figure 6:
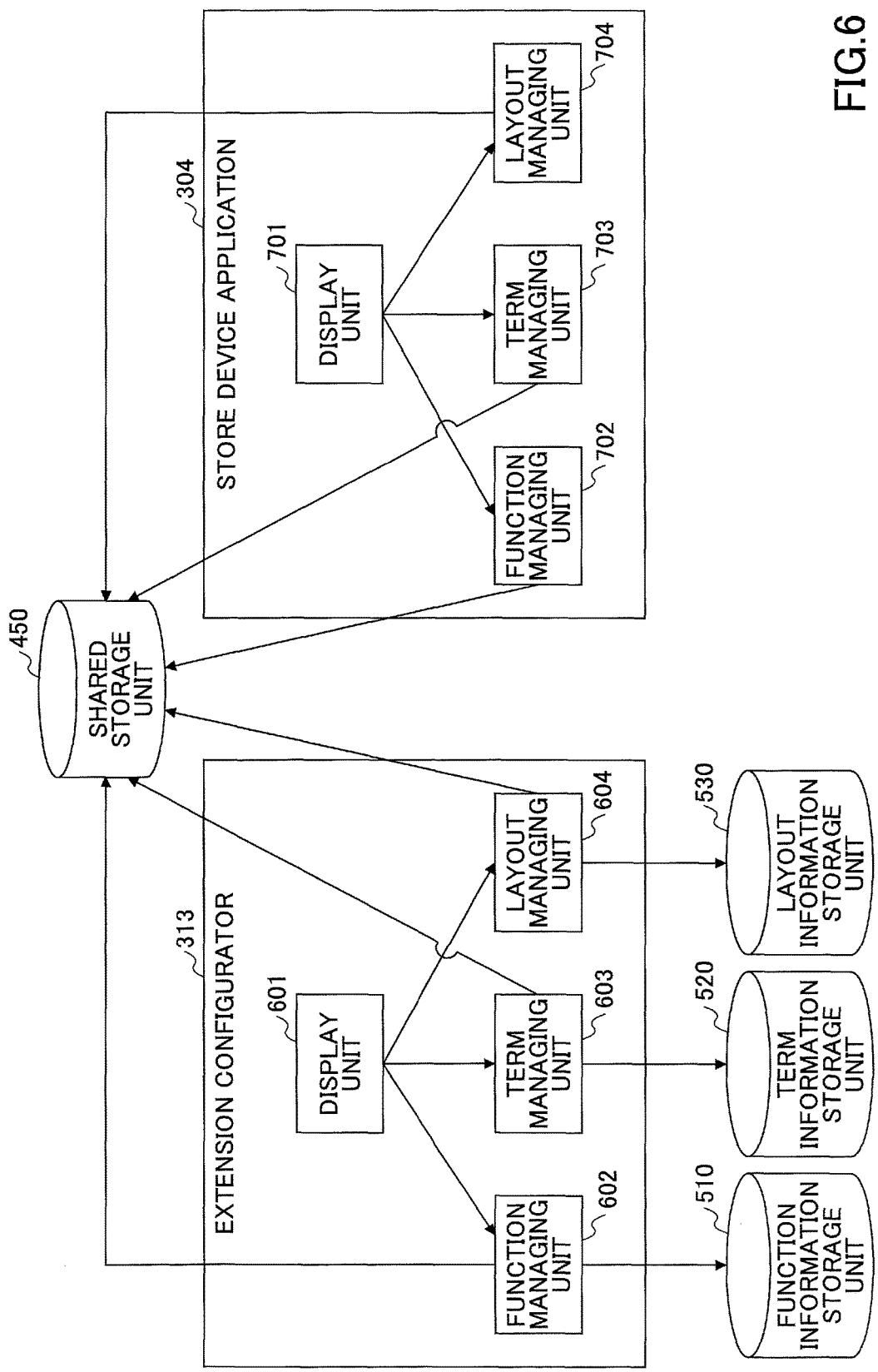
FIG. 6 is a functional block diagram of an example of the client device according to the first embodiment of the present invention.

Next, a functional configuration of the client device 10 according to a first embodiment will be described by referring to FIG. 6. FIG. 6 is a functional block diagram of an example of the client device 10 according to the first embodiment.

As illustrated in FIG. 6, the extension configurator 313 of the client device 10 according to the first embodiment includes a display unit 601, a function managing unit 602, a term managing unit 603, and a layout managing unit 604. Note that the extension configurator 313 is a printer extension (PrinterExtensions).

Furthermore, the store device application 304 of the client device 10 includes a display unit 701, a function managing unit 702, a term managing unit 703, and a layout managing unit 704.

Furthermore, the client device 10 includes a function information storage unit 510, a term information storage unit 520, a layout information storage unit 530, and a shared storage unit 450. Among these storage units, the function information storage unit 510, the term information storage unit 520, and the layout information storage unit 530 are implemented by the individual memory area 500. On the other hand, the shared storage unit 450 may be implemented by the UserPropertyBag 430 and the QueuePropertyBag 420, etc.

Note that the shared storage unit 450 is not limited to the above. For example, the shared storage unit 450 may be implemented by a LocalState folder of the store device application 304, or may be implemented by a predetermined storage area such as a storage device coupled to the client device 10 via a network, as long as the storage area is accessible from the store device application 304.

Based on the function information received from the function managing unit 602, the term information received from the term managing unit 603, and the layout information received from the layout managing unit 604, the display unit 601 displays a print setting screen specific to a vendor in the desktop UI. In the following description, the print setting screen specific to a vendor in the desktop UI is also referred to as a "vendor-specific print setting screen (desktop UI)" or a "print setting screen (desktop UI)".

Here, the term information is related to the display name, etc., of the print setting displayed in the vendor-specific print setting screen. Furthermore, the layout information is related to arrangement positions and sizes, etc., of various Graphical User Interface (GUI) parts such as combo boxes and spin boxes arranged in the vendor-specific print setting screen. Furthermore, the function information is setting information related to functions that a user can add, change, or delete (for example, a setting set in which a plurality of print settings are set as a single set, and a watermark, etc.

The function managing unit 602 manages function information used for displaying the vendor-specific print setting screen (desktop UI).

That is, the function managing unit 602 acquires the function information stored in the function information storage unit 510 and the function information stored (saved) in the shared storage unit 450 in response to a request (function information acquisition request) from the display unit 601. Then, the function managing unit 602 returns the acquired function information to the display unit 601 and saves the function information in the shared storage unit 450. Note that the shared storage unit 450 stores various kinds of information (term information, layout information, and function information) to be shared between the extension configurator 313 and the store device application 304 as described later.

Furthermore, in response to a request (function information update request) from the display unit 601, the function managing unit 602 updates the function information stored in the function information storage unit 510 and the function information stored (saved) in the shared storage unit 450.

The term managing unit 603 manages the term information used for displaying the vendor-specific print setting screen (desktop UI). That is, the term managing unit 603 acquires the term information from the term information storage unit 520 in response to the request (term information acquisition request) from the display unit 601, returns the acquired term information to the display unit 601, and saves the term information in the shared storage unit 450.

The layout managing unit 604 manages layout information used for displaying the vendor-specific print setting screen (desktop UI). That is, the layout managing unit 604 acquires layout information from the layout information storage unit 530 in response to a request (layout information acquisition request) from the display unit 601, returns the acquired layout information to the display unit 601, and stores the layout information in the shared storage unit 450.

In this manner, the function managing unit 602, the term managing unit 603, and the layout managing unit 604 acquire the function information, the term information, and the layout information, respectively, and save the acquired information in the shared storage unit 450. The reason for doing this is that the function information, the term information, and the layout information are stored in the storage units (the function information storage unit 510, the term information storage unit 520, and the layout information storage unit 530) implemented by the individual memory area 500, as described above. Furthermore, another reason for doing this is that there are cases where the function information, the term information, and the layout information are added and changed, etc., after the installation of the printer driver 303.

Specifically, for example, when the user desires to apply a new language (for example, Arabic, etc.) after installing the printer driver 303, the user adds term information to the term information storage unit 520, etc. Furthermore, for example, when the user desires to change the layout of the print setting screen according to the user's preference, the user changes the layout information stored in the layout information storage unit 530, etc.

Based on the function information received from the function managing unit 702, the term information received from the term managing unit 703, and the layout information received from the layout managing unit 704, the display unit 701 displays the vendor-specific print setting screen in the store application UI. In the following description, the vender-specific print setting screen in the store application UI is also referred to as "vendor-specific print setting screen (store application UI)" or "print setting screen (store application UI)".

The function managing unit 702 manages function information used for displaying the vendor-specific print setting screen (store application UI). That is, the function managing unit 702 acquires the function information from the shared storage unit 450 in response to a request from the display unit 701 (function information acquisition request), and returns the acquired function information to the display unit 701.

Furthermore, the function managing unit 702 updates the function information stored (saved) in the shared storage unit 450, in response to a request (function information update request) from the display unit 701.

The term managing unit 703 manages the term information used for displaying the vendor-specific print setting screen (store application UI). That is, the term managing unit 703 acquires the term information from the shared storage unit 450, in response to a request (term information acquisition request) from the display unit 701, and returns the acquired term information to the display unit 701.

The layout managing unit 704 manages layout information used for displaying the vendor-specific print setting screen (store application UI). That is, the layout managing unit 704 acquires layout information from the shared storage unit 450 in response to a request (layout information acquisition request) from the display unit 701, and returns the acquired layout information to the display unit 701.

The term information storage unit 520 stores the term information. As described above, the term information is information related to the display name, etc., of the print setting displayed in the vendor-specific print setting screen. An example of term information 1100 stored in the term information storage unit 520 is illustrated in FIG. 7.

In the term information 1100 illustrated in FIG. 7, the setting identification information for identifying the print setting and the display name in the print setting screen of the setting identification information are defined in association with each other in the JavaScript Object Notation (JSON) format.

That is, in the term information 1100 illustrated in FIG. 7, for example, setting identification information "orientation" and "paper orientation" are associated with each other. Furthermore, in the term information 1100 illustrated in FIG. 7, for example, the setting identification information "printsize" and the "paper size" are associated with each other.

Accordingly, the display unit 601 can display "paper orientation" in the vendor-specific print setting screen (desktop UI), as the item name, etc., for setting a setting value of the print setting identified by the setting identification information "orientation". Similarly, the display unit 601 can display "paper size" in the vendor-specific print setting screen (desktop UI), as the item name, etc., for setting a setting value of the print setting identified by the setting identification information "printsize". The same applies to the case where the display unit 701 displays the vendor-specific print setting screen (store application UI).

The layout information storage unit 530 stores layout information. As described above, the layout information is information related to the arrangement position and size of various types of GUI parts arranged in the vendor-specific print setting screen. Here, an example of layout information 1200 stored in the layout information storage unit 530 is illustrated in FIG. 8.

In the layout information 1200 illustrated in FIG. 8, the type of the GUI component, the GUI component name, and the position and the size of the GUI component are defined in the JSON format.

That is, in the layout information 1200 illustrated in FIG. 8, for example, "Gui::ComboBox" as the type of the GUI component, "colorbw" as the GUI component name, and "params" specifying the position and size of the GUI component, are defined. Furthermore, in "params", coordinates "x": 255 and "y": 189 indicating the arrangement position of the GUI component, and the size "width": 143, are defined.

Accordingly, the display unit 601 can display the vendor-specific print setting screen (desktop UI) in which the GUI component of the combo box is arranged. The same applies to the case where the display unit 701 displays the vendor-specific print setting screen (store application UI).

The function information storage unit 510 stores the function information. As described above, the function information is setting information related to a function (for example, a setting set and a watermark, etc.) that a user can add, change, or delete. Here, an example of function information 1300 stored in the function information storage unit 510 is illustrated in FIG. 9.

In the function information 1300 illustrated in FIG. 9, the name, a comment, a print setting, and a setting value of the setting set are defined in the JSON format.

That is, in the function information 1300 illustrated in FIG. 9, for example, "2 in 1 landscape" as the name of the setting set, "test" as the comment, and "settings" as the print setting and the setting value of the print setting, are defined. Furthermore, in "settings", a print setting "paper orientation" and the corresponding setting value "orientation": "landscape", and a print setting "aggregate" and the corresponding setting value "nup":"2 in 1", are defined.

Accordingly, the display unit 601 can display information of various functions that the user can add, change, or delete, in the vendor-specific print setting screen (desktop UI). The same applies to the case where the display unit 701 displays the vendor-specific print setting screen (store application UI).

Note that in FIG. 9, the function information 1300 in which a setting set is defined is illustrated as an example; however, the function information is not limited as such. For example, in the function information, setting information related to various functions such as a watermark and groundtint printing may be defined.

Note that as described above, the function information storage unit 510, the term information storage unit 520, and the layout information storage unit 530 are implemented by the individual memory area 500. Therefore, while these storage units can be accessed from the extension configurator 313, these storage units cannot be accessed from the store device application 304.

The shared storage unit 450 stores various kinds of information (term information, layout information, and function information) shared between the extension configurator 313 and the store device application 304. Note that, as described above, the shared storage unit 450 is implemented by, for example, the UserPropertyBag 430 and the QueuePropertyBag 420, etc. Therefore, the shared storage unit 450 can be accessed from both the extension configurator 313 and the store device application 304.

Therefore, the client device 10 can display a vendor-specific print setting screen by using the term information, the layout information, and the function information that are common to the extension configurator 313 and the store device application 304.

Accordingly, for example, when the function information is changed in the vendor-specific print setting screen (desktop UI), the client device 10 can apply the change to the vendor-specific print setting screen (store application UI). Similarly, for example, when the function information is changed in the vendor-specific print setting screen (store application UI), the client device 10 can apply the change to the vendor-specific print setting screen (desktop UI).

<Process Details-First Embodiment>

Next, the details of the process performed by the client device 10 according to the first embodiment will be described.

<<Display of Print Setting Screen (Desktop UI) and Change of Function Information—First Embodiment>>

First, by referring to FIG. 10, a description will be given of a process in the case where the user of the client device 10 displays the vendor-specific print setting screen (desktop UI) from the desktop application 321, and subsequently changes the function information. FIG. 10 is a sequence diagram of an example of a process in which the print setting screen (desktop UI) is displayed and subsequently the function information is changed.

First, the user performs an operation for displaying the print setting screen from the desktop application 321 (step S1001). That is, for example, the user performs an operation for displaying the vendor-specific print setting screen, in the print screen displayed by issuing a print instruction in the desktop application 321. Note that, for example, the user can perform the operation for displaying the vendor-specific print setting screen by pressing a "detailed setting" button, etc., in the print screen.

When the user performs the operation to display the print setting screen, the desktop application 321 accepts the display operation (step S1002). Then, the desktop application 321 requests the display unit 601 of the extension configurator 313 to display the vendor-specific print setting screen (step S1003).

Next, upon receiving the request to display the vendor-specific print setting screen, the display unit 601 of the extension configurator 313 requests the term managing unit 603 to acquire the term information (step S1004).

Upon receiving the term information acquisition request, the term managing unit 603 acquires the term information from the term information storage unit 520 (step S1005). That is, the term managing unit 603 acquires, for example, the term information 1100 illustrated in FIG. 7, from the term information storage unit 520.

Next, the term managing unit 603 saves the term information acquired in step S1005, in the shared storage unit 450 (step S1006). This makes it possible for the extension configurator 313 and the store device application 304 to share the term information acquired in step S1005.

Then, the term managing unit 603 returns the term information acquired in step S1005, to the display unit 601.

Note that the extension configurator 313 can access the PropertyBag 400 by using, for example, an argument "PrinterExtensionEventArgs" transferred when activating the printer extension (PrinterExtensions).

Next, the display unit 601 requests the layout managing unit 604 to acquire the layout information (step S1007).

Upon receiving the layout information acquisition request, the layout managing unit 604 acquires the layout information from the layout information storage unit 530 (step S1008). That is, the layout managing unit 604 acquires, for example, the layout information 1200 illustrated in FIG. 8, from the layout information storage unit 530.

Next, the layout managing unit 604 saves the layout information acquired in step S1008, in the shared storage unit 450 (step S1009). Accordingly, the layout information acquired in step S1008 can be shared between the extension configurator 313 and the store device application 304.

Then, the layout managing unit 604 returns the layout information acquired in step S1008, to the display unit 601.

Next, the display unit 601 requests the function managing unit 602 to acquire the function information (step S1010).

Upon receiving the function information acquisition request, the function managing unit 602 acquires the function information stored in the function information storage unit 510 and the function information stored (saved) in the shared storage unit 450 (step S1011).

Note that, for example, when the function information is stored in the function information storage unit 510, but there is no function information stored (stored) in the shared storage unit 450, the function managing unit 602 only acquires the function information stored in the function information storage unit 510.

Furthermore, for example, when there is function information stored in both the function information storage unit 510 and the shared storage unit 450, the function managing unit 602 may acquire only the function information having the latest update date/time, among these pieces of function information.

Next, the function managing unit 602 saves the function information acquired in step S1011, in the shared storage unit 450 (step S1012). Accordingly, the function information acquired in step S1011 can be shared between the extension configurator 313 and the store device application 304.

Note that, for example, when only the function information stored in the shared storage unit 450 is acquired in step S1011, the function managing unit 602 does not have to perform the process of step S1012.

Then, the function managing unit 602 returns the function information acquired in step S1011, to the display unit 601.

Upon receiving the term information, the layout information, and the function information, the display unit 601 displays the vendor-specific print setting screen (desktop UI) based on these pieces of information (step S1013). That is, the display unit 601 displays, for example, a print setting screen (desktop UI) G100 illustrated in FIG. 11.

The print setting screen (desktop UI) G100 illustrated in FIG. 11 is a vendor-specific print setting screen in the desktop UI displayed based on the term information, the layout information, and the function information.

Here, the print setting screen (desktop UI) G100 illustrated in FIG. 11 includes a setting set list G110 indicating a list of setting sets, and an edit button G120 for editing a setting set selected from the setting set list G110.

In this manner, the display unit 601 of the extension configurator 313 displays the vendor-specific print setting screen (desktop UI) based on the term information, the layout information, and the function information.

Next, the user performs an operation for changing the function information, in the vendor-specific print setting screen (desktop UI) (step S1014). That is, for example, in the print setting screen (desktop UI) G100 illustrated in FIG. 11, the user selects a desired setting set from the setting set list G110, and then presses the edit button G120 to edit the setting set, to perform an operation to change the function information. Editing the setting set is to change, for example, the name of the setting set, the comment, and the print setting and the corresponding setting value.

Note that the changing of the function information is not limited to the editing of the setting set. The function information may be changed, for example, by changing an image used for the watermark function. In this manner, the changing of the function information is to change the settings, etc., of various functions uniquely provided by the vendor.

When the function information changing operation is performed by the user, the display unit 601 accepts the changing operation (step S1015). Then, the display unit 601 requests the function managing unit 602 to update the function information (step S1016). Note that the function information update request includes, for example, the function information that has been changed by the user's changing operation.

Upon receiving the function information update request, the function managing unit 602 updates the function information stored in the function information storage unit 510 and the function information stored (saved) in the shared storage unit 450 (step S1017). That is, the function managing unit 602 updates the function information stored in the function information storage unit 510 and the shared storage unit 450, respectively, by the function information included in the function information update request.

Specifically, for example, it is assumed that the "name" of the function information included in the function information update request, is "2 in 1 landscape". In this case, the function managing unit 602 updates the function information whose "name" is "2 in 1 landscape", among the function information stored in the function information storage unit 510. Similarly, the function managing unit 602 updates the function information whose "name" is "2 in 1 landscape", among the function information stored in the shared storage unit 450.

Accordingly, when the function information is changed in the vendor-specific print setting screen (desktop UI), the client device 10 can update the function information stored in the function information storage unit 510 and the function information stored in the shared storage unit 450, respectively, to the changed function information.

<<Display of Print Setting Screen (Store Application UI) and Change of Function Information—First Embodiment>>

Next, by referring to FIG. 12, a description will be given of a process in the case where the user of the client device 10 displays the vendor-specific print setting screen (store application UI) from the store application 311, and subsequently changes the function information. FIG. 12 is a sequence diagram of an example of a process in which the print setting screen (store application UI) is displayed and subsequently the function information is changed.

First, the user performs an operation for displaying the print setting screen from the store application 311 (step S1201). That is, for example, the user performs an operation for displaying the vendor-specific print setting screen on a print screen displayed by issuing a print instruction in the store application 311. Note that, for example, the user can perform an operation for displaying the vendor-specific print setting screen by pressing a "detailed setting" button, etc., in the print screen.

When the user performs the operation to display the print setting screen, the store application 311 accepts the display operation (step S1202). Then, the store application 311 requests the display unit 701 of the store device application 304 to display the vendor-specific print setting screen (step S1203).

Next, upon receiving the request to display the vendor-specific print setting screen, the display unit 701 of the store device application 304 requests the term managing unit 703 to acquire the term information (step S1204).

Upon receiving the term information acquisition request, the term managing unit 703 acquires the term information from the shared storage unit 450 (step S1205). That is, the term managing unit 703 acquires the term information saved in the shared storage unit 450 by the extension configurator 313 in step S1006 of FIG. 10. Accordingly, the store device application 304 can display the print setting screen (store application UI) by using the same term information as the term information used when the extension configurator 313 displays the print setting screen (desktop UI).

Then, the term managing unit 703 returns the term information acquired in step S1205, to the display unit 701.

Note that the store device application 304 can access the PropertyBag 400 by using, for example, the PrintExtensionContext.

Next, the display unit 701 requests the layout managing unit 704 to acquire layout information (step S1206).

Upon receiving the layout information acquisition request, the layout managing unit 704 acquires the layout information from the shared storage unit 450 (step S1207). That is, the layout managing unit 704 acquires the layout information saved in the shared storage unit 450 by the extension configurator 313 in step S1009 of FIG. 10. Accordingly, the store device application 304 can display the print setting screen (store application UI) by using the same layout information as the layout information used when the extension configurator 313 displays the print setting screen (desktop UI).

The layout managing unit 704 then returns the layout information acquired in step S1207, to the display unit 701.

Next, the display unit 701 requests the function managing unit 702 to acquire the function information (step S1208).

Upon receiving the function information acquisition request, the function managing unit 702 acquires the function information from the shared storage unit 450 (step S1209). That is, the function managing unit 702 acquires the function information saved in the shared storage unit 450 by the extension configurator 313 in step S1012 of FIG. 10. Accordingly, the store device application 304 can display the print setting screen (store application UI) by using the same function information as the function information used when the extension configurator 313 displays the print setting screen (desktop UI).

Then, the function managing unit 702 returns the function information acquired in step S1209, to the display unit 701.

Upon receiving the term information, the layout information, and the function information, the display unit 701 displays the vendor-specific print setting screen (store application UI) based on these pieces of information (step S1210). That is, the display unit 701 displays, for example, a print setting screen (store application UI) G200 illustrated in FIG. 13.

Figure 13:
FIG. 13 illustrates an example of a print setting screen (store application UI) according to the first embodiment of the present invention.

The print setting screen (store application UI) 6200 illustrated in FIG. 13 is the vendor-specific print setting screen in the store application UI displayed based on the term information, the layout information, and the function information.

Here, the print setting screen (store application UI) G200 illustrated in FIG. 13 includes a setting set list G210 indicating a list of setting sets. Note that the setting set list G210 may not be displayed when the print setting screen (store application UI) G200 illustrated in FIG. 13 is displayed, but may be displayed by pressing a predetermined GUI part, etc.

In this manner, the display unit 701 of the store device application 304 displays the vendor-specific print setting screen (store application UI) based on the term information, the layout information, and the function information stored in the shared storage unit 450. Said differently, the store device application 304 displays the vendor-specific print setting screen (store application UI) based on the term information, the layout information, and the function information that are shared with the extension configurator 313.

Next, the user performs an operation for changing the function information in the print setting screen (store application UI) (step S1211). That is, for example, in the print setting screen (store application UI) G200 illustrated in FIG. 13, the user selects a desired setting set from the setting set list G210 and performs an operation for editing the setting set, to perform the operation to change the function information. Note that as described above, the changing of the function information is not limited to the editing of the setting set.

When the operation to change the function information is performed by the user, the display unit 701 accepts the changing operation (step S1212). Then, the display unit 701 requests the function managing unit 702 to update the function information (step S1213). Note that the function information update request includes, for example, the function information changed by a user's changing operation.

Upon receiving the function information update request, the function managing unit 702 updates the function information stored (saved) in the shared storage unit 450 (step S1214). That is, for example, the function managing unit 702 updates the function information stored in the shared storage unit 450, to the function information included in the update request of the function information.

Accordingly, when the function information is changed in the vendor-specific print setting screen (store application UI), the client device 10 can update the function information stored in the shared storage unit 450, to the changed function information.

As described above, in the client device 10 according to the first embodiment, the term information, the layout information, and the function information can be shared between the extension configurator 313 and the store device application 304. Therefore, in the client device 10 of the first embodiment, it is possible to display the print setting screen (desktop UI) and the print setting screen (store application UI) based on the same term information, the same layout information, and the same function information.

Furthermore, in the client device 10 according to the first embodiment, when the function information is changed in either the print setting screen (desktop UI) or the print setting screen (store application UI), the function information stored in the shared storage unit 450 is updated. Accordingly, in the client device 10 according to the first embodiment, the operation of changing the function information performed in either the print setting screen (desktop UI) or the print setting screen (store application UI), can be applied to the other one of these screens.

Furthermore, in the client device 10 according to the first embodiment, for example, by changing the term information stored in the term information storage unit 520 and the layout information stored in the layout information storage unit 530, a change that is made in the display mode of the print setting screen (desktop UI), can also be applied to the print setting screen (store application UI). That is, in the client device 10 according to the first embodiment, by changing the term information stored in the term information storage unit 520 and the layout information stored in the layout information storage unit 530, the display mode of the print setting screen (store application UI) can be changed dynamically.

<<Modified Example of Display of Print Setting Screen (Store Application UI) and Change of Function Information—First Embodiment>>

Figure 14:
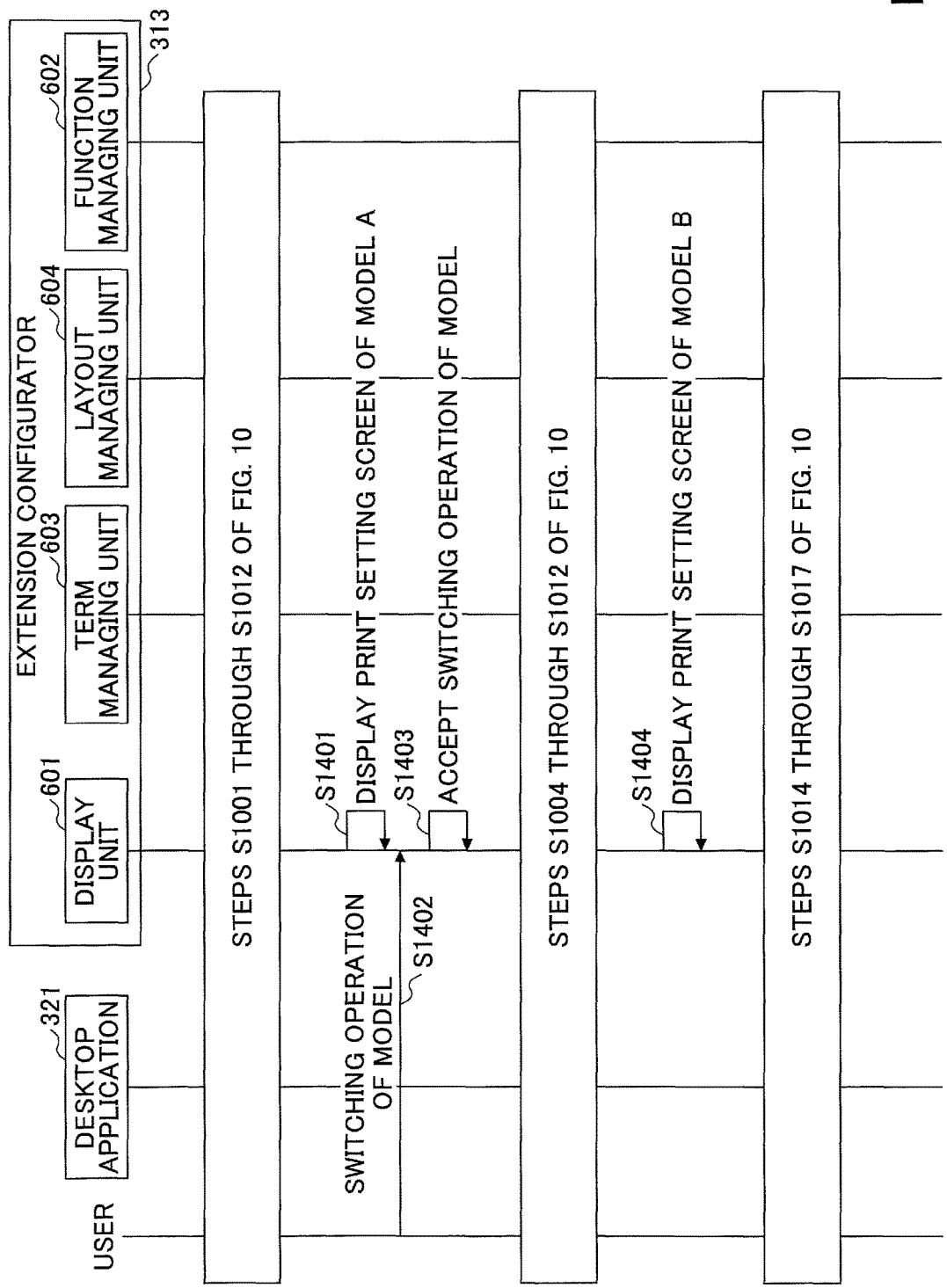
FIG. 14 is a sequence diagram of another example of the process in which the print setting screen (desktop UI) is displayed and subsequently the function information is changed according to the first embodiment of the present invention.

Here, a modified example of the displaying of the print setting screen (store application UI) and the changing of the function information described by referring to FIG. 10, will be described by referring to FIG. 14. FIG. 14 is a sequence diagram of another example of the process in which the print setting screen (desktop UI) is displayed and subsequently the function information is changed. In FIG. 14, it is assumed that the printer driver 303 supports a plurality of models of the image forming apparatuses 20 (that is, the printer driver 303 is a so-called printer driver common to different models). Note that in FIG. 14, the processes of steps S1001 and S1012 and steps S1014 through S1017 is the same as those of FIG. 10, and therefore descriptions of these processes are omitted.

Following step S1012, upon receiving the term information, the layout information, and the function information, the display unit 601 displays a vendor-specific print setting screen (desktop UI) of a model A based on these pieces of information (step S1401). Here, the model A is, for example, the model of the image forming apparatus 20 set in advance in the printer driver 303.

Next, the user performs an operation of switching the model in the print setting screen (desktop UI) of the model A (step S1402). Hereinafter, it is assumed that the user has performed an operation for switching to a model B.

When the user performs the operation of switching the model, the display unit 601 accepts the switching operation (step S1403). Then, after step S1004 through step S1012, upon receiving the term information, the layout information, and the function information, the display unit 601 displays a vendor-specific print setting screen (desktop UI) of the model B, based on the received pieces of information (step S1404).

In this manner, the client device 10 may execute the process of saving the term information, the layout information, and the function information in the shared storage unit 450 (steps S1004 through S1012) when the model switching operation is performed in the print setting screen (desktop UI). Accordingly, for example, in the client device 10, the term information, the layout information, and the function information can be shared between the extension configurator 313 and the store device application 304, on a per-model basis.

Second Embodiment

Next, a second embodiment will be described. In the second embodiment, when the printer driver 303 is installed, the term information, the layout information, and the function information are saved in the shared storage unit 450. Accordingly, in the client device 10 according to the second embodiment, for example, even before the print setting screen (desktop UI) is displayed, the term information, the layout information, and the function information can be shared between the extension configurator 313 and the store device application 304.

Note that in the second embodiment, the portions having substantially the same functions as those of the first embodiment and the portions performing the same processes as those of the first embodiment are denoted by the same reference numerals as those of the first embodiment, and descriptions of these portions are omitted.

<Functional Configuration—Second Embodiment>

Figure 15:
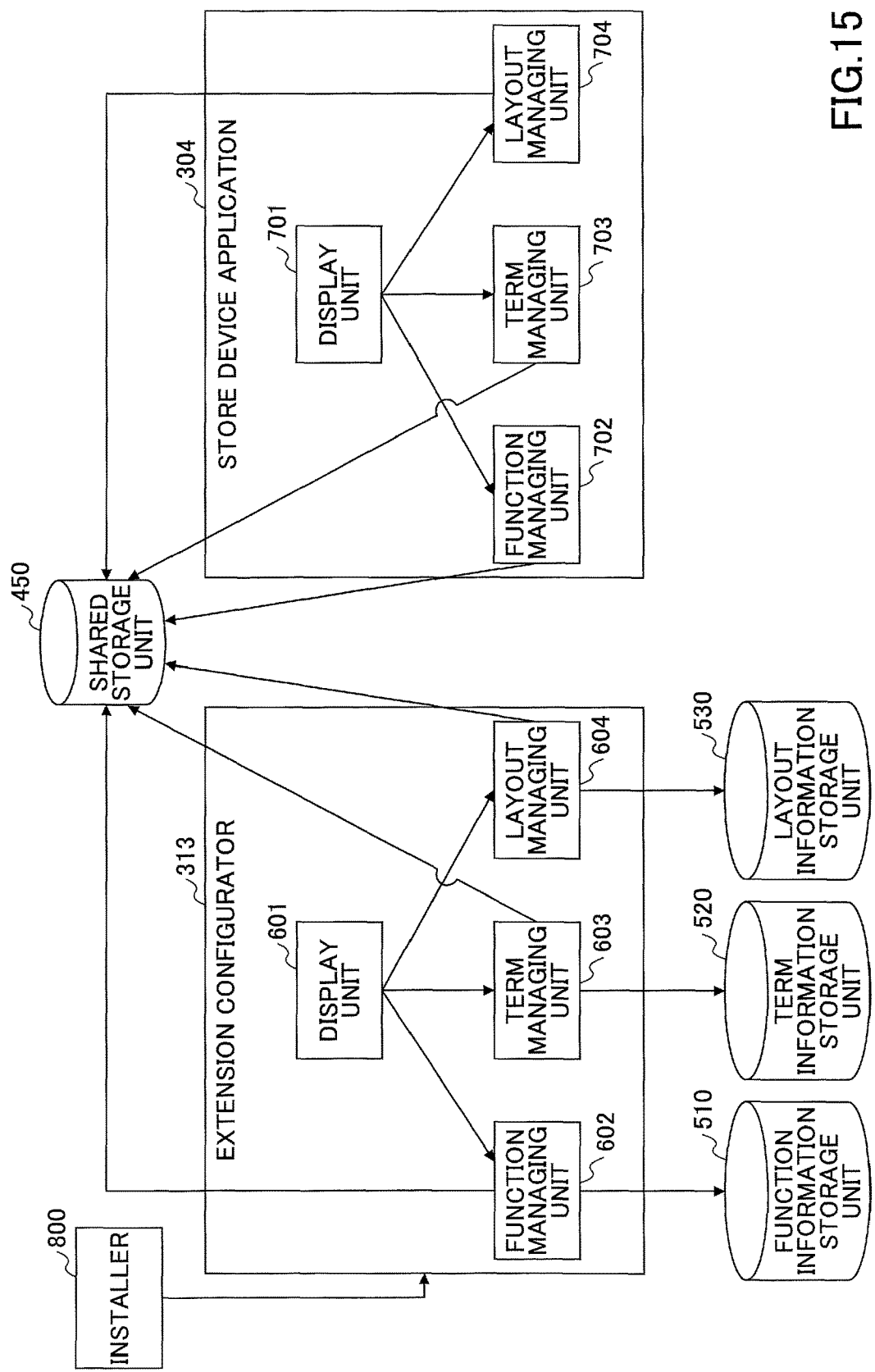
FIG. 15 is a functional block diagram of an example of the client device according to a second embodiment of the present invention.

First, a functional configuration of the client device 10 according to the second embodiment will be described by referring to FIG. 15. FIG. 15 is a functional block diagram of an example of the client device 10 according to the second embodiment.

As illustrated in FIG. 15, the client device 10 according to the second embodiment includes an installer 800. The installer 800 is a program for installing the printer driver 303 in the client device 10.

When installing the printer driver 303, the installer 800 requests the extension configurator 313 to save the term information, the layout information, and the function information. Accordingly, the extension configurator 313 can save the term information, the layout information, and the function information in the shared storage unit 450.

<Process Details—Second Embodiment>

Next, the details of the process performed by the client device 10 according to the second embodiment will be described.

<<Saving Term Information, Layout Information, and Function Information when Installing Printer Driver 303—Second Embodiment>>

Figure 16:
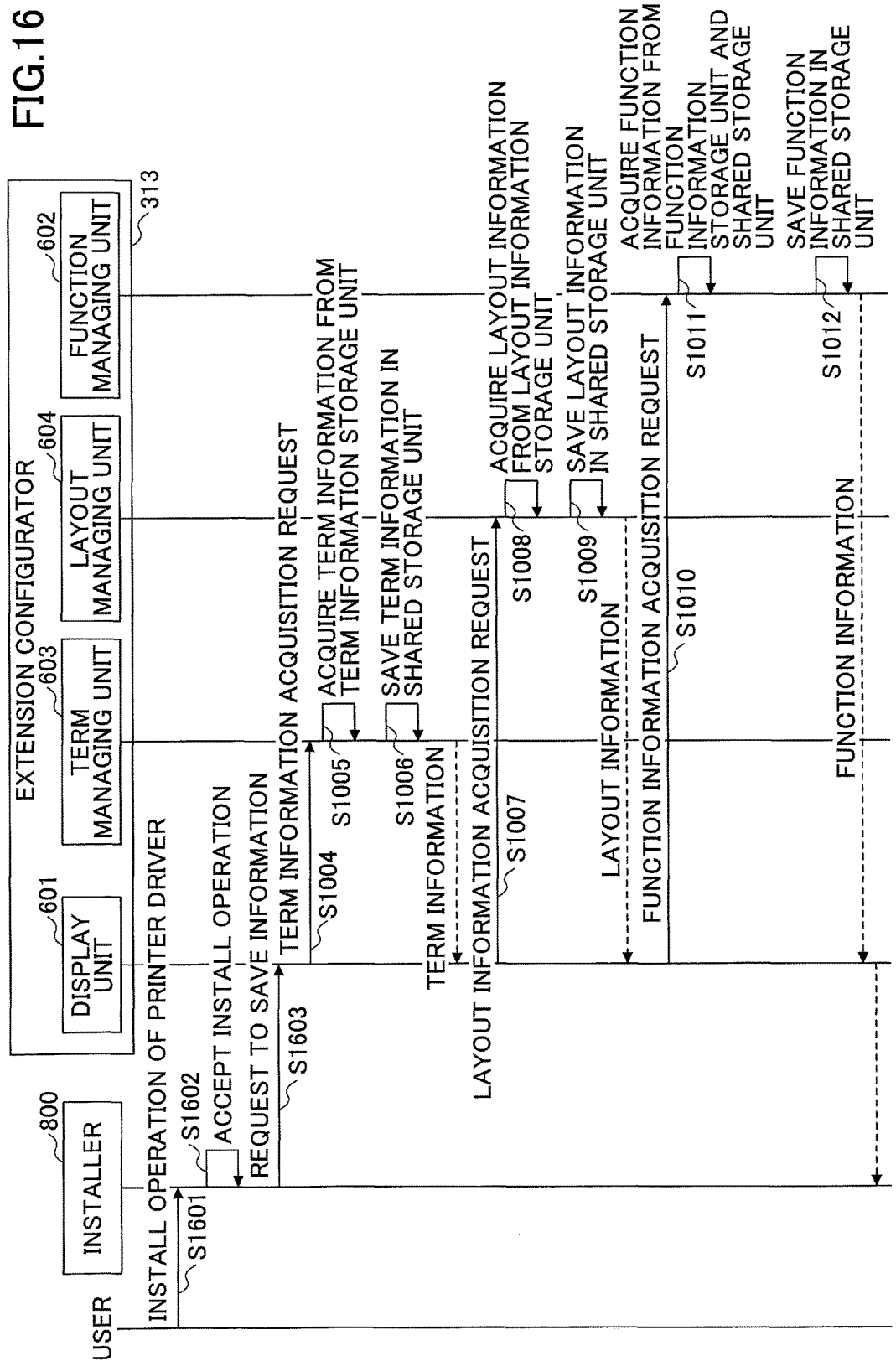
FIG. 16 is a sequence diagram of an example of a process of saving the term information, the layout information, and the function information in a shared storage unit, at the time of installing the printer driver according to the second embodiment of the present invention.

In the following description, the process of a case of saving the term information, the layout information, and the function information in the shared storage unit 450, at the time of installing the printer driver 303, will be described by referring to FIG. 16. FIG. 16 is a sequence diagram of an example of a process of saving the term information, the layout information, and the function information in the shared storage unit 450, at the time of installing the printer driver 303.

First, the user performs an operation for installing the printer driver 303 from the installer 800 (step S1601). That is, for example, in an installation start screen displayed by the installer 800, the user performs an operation for starting the installation of the printer driver 303.

When the install operation is performed by the user, the installer 800 accepts the install operation (step S1602). Then, the installer 800 requests the display unit 601 of the extension configurator 313 to save information (term information, layout information, and function information) (step S1603). Note that the installer 800 can issue a request for saving information to the extension configurator 313, for example, by using CreateProcess ( ).

Subsequently, the extension configurator 313 executes the processes of steps S1004 through S1012. That is, the extension configurator 313 saves, in the shared storage unit 450, the function information, the term information, and the layout information that are stored in the function information storage unit 510, the term information storage unit 520, and the layout information storage unit 530, respectively.

As described above, in the client device 10 according to the second embodiment, the term information, the layout information, and the function information can be saved in the shared storage unit 450 at the time of installing the printer driver 303. Thus, in the client device 10 according to the second embodiment, for example, even before the print setting screen (desktop UI) is displayed, the print setting screen (store application UI) can be displayed based on the term information, the layout information, and the function information.

Third Embodiment

Next, a third embodiment will be described. In the third embodiment, for example, an icon (image) representing a setting set is generated based on the function information in which the setting set is defined. That is, as described above, the shared storage unit 450 is implemented by, for example, the UserPropertyBag 430 and the QueuePropertyBag 420; however, image data cannot be saved in these storage areas. Therefore, in the third embodiment, image data of an icon representing a setting set is generated based on the function information shared between the print setting screen (desktop UI) and the print setting screen (store application UI).

Accordingly, in the client device 10 according to the third embodiment, for example, it is possible to generate image data of an icon representing a setting set that is the same in the print setting screen (desktop UI) and in the print setting screen (store application UI).

Note that in the third embodiment, the portions having substantially the same functions as those of the first embodiment and the portions performing the same processes as those of the first embodiment are denoted by the same reference numerals as those of the first embodiment, and descriptions of these portions are omitted.

<Functional Configuration—Third Embodiment>

Figure 17:
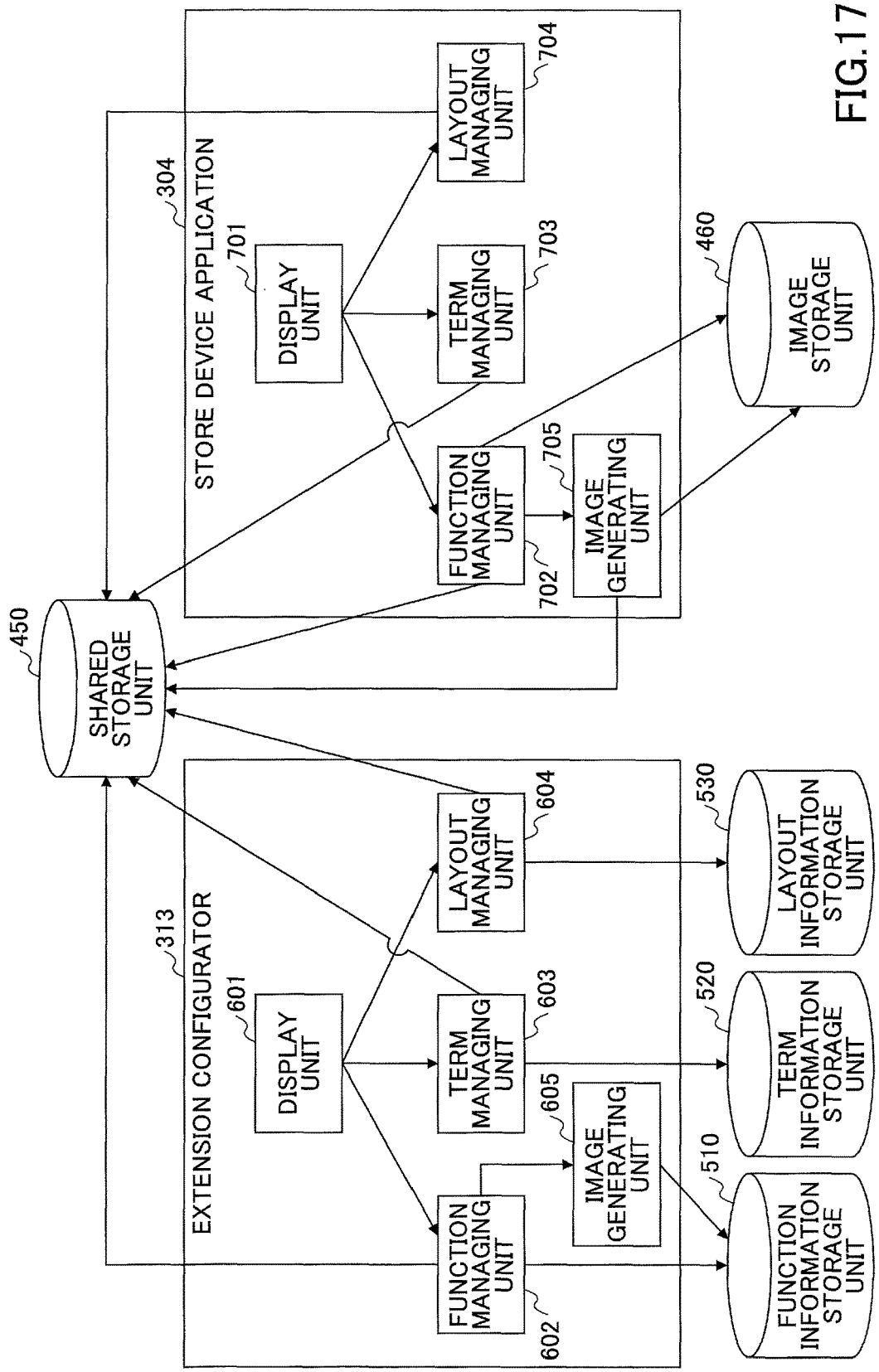
FIG. 17 is a functional block diagram of an example of the client device according to a third embodiment of the present invention.

First, a functional configuration of the client device 10 according to the third embodiment will be described by referring to FIG. 17. FIG. 17 is a functional block diagram of an example of the client device 10 according to the third embodiment.

As illustrated in FIG. 17, the extension configurator 313 of the client device 10 according to the third embodiment includes an image generating unit 605. Furthermore, the store device application 304 of the client device 10 according to the third embodiment includes an image generating unit 705. Furthermore, the client device 10 according to the third embodiment includes an image storage unit 460. The image storage unit 460 is implemented by, for example, a LocalState folder that is writable by the store device application 304.

In response to a request (image generation request) from the function managing unit 602, the image generating unit 605 of the extension configurator 313 generates image data of an icon representing, for example, a setting set defined in the function information. Furthermore, the image generating unit 605 stores the generated image data in the function information storage unit 510.

In response to a request (image generation request) from the function managing unit 702, the image generating unit 705 of the store device application 304 generates, for example, image data of an icon representing a setting set defined in the function information. Furthermore, the image generating unit 705 saves the generated image data in the image storage unit 460.

The image storage unit 460 stores (saves) the image data generated by the image generating unit 705, in association with the function information.

Figure 18A:
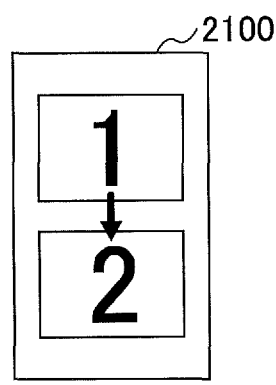
FIGS. 18A and 18B illustrate examples of an icon representing a setting set according to the third embodiment of the present invention.
Figure 18B:
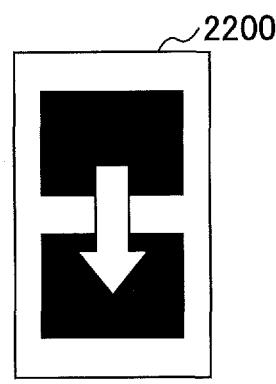

Here, examples of an icon representing the setting set are illustrated in FIGS. 18A and 18B. An icon 2100 illustrated in FIG. 18A represents a setting set (2 in 1 landscape) defined in the function information 1300 illustrated in FIG. 9. This icon 2100 is displayed by the image data generated by the image generating unit 605 of the extension configurator 313. An icon 2200 illustrated in FIG. 18B represents a setting set (2 in 1 landscape) defined in the function information 1300 illustrated in FIG. 9. This icon 2200 is displayed by the image data generated by the image generating unit 705 of the store device application 304.

In this manner, the image generating unit 605 generates image data of the icon 2100 displayed in the print setting screen (desktop UI). Furthermore, the image generating unit 705 generates image data of the icon 2200 displayed in the print setting screen (store application UI).

Note that in the examples illustrated in FIGS. 18A and 18B, the icon 2100 and the icon 2200, which represent the same setting set, are different; however, the present embodiment is not limited as such. The icon 2100 and the icon 2200 may be the same. That is, the image generating unit 605 and the image generating unit 705 may generate the same image data for displaying an icon, with respect to the icon representing the same setting set.

<Process Details—Third Embodiment>

Next, the details of the process performed by the client device 10 according to the third embodiment will be described.

<<Display of Print Setting Screen (Desktop UI) and Registration of Function Information—Third Embodiment>>

Figure 19:
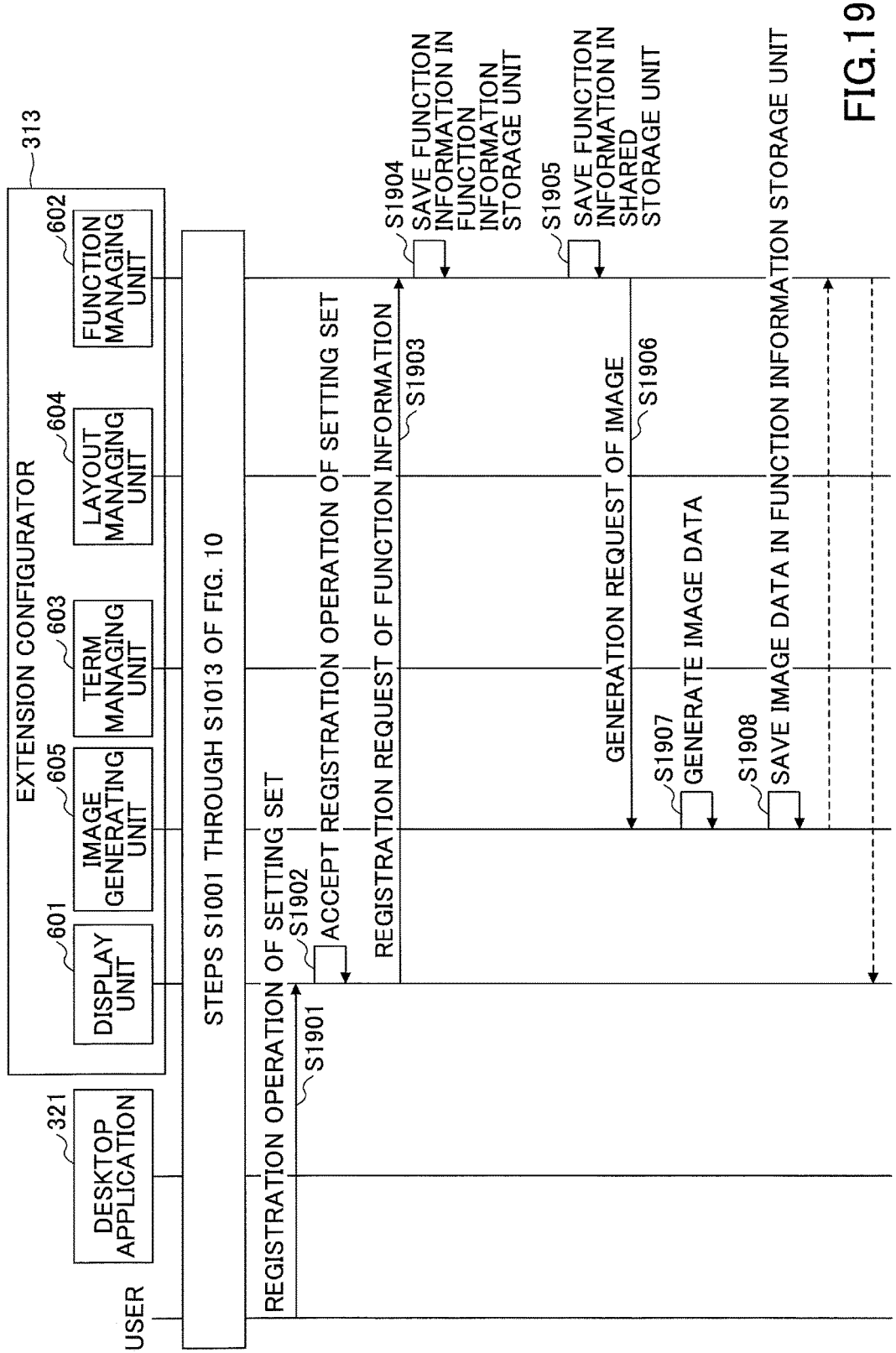
FIG. 19 is a sequence diagram of an example of a process in which the print setting screen (desktop UI) is displayed and subsequently the setting set is registered according to the third embodiment of the present invention.

First, by referring to FIG. 19, a description will be given of a process in the case where a user of the client device 10 displays the vendor-specific print setting screen (desktop UI) from the desktop application 321, and subsequently registers function information (setting set). FIG. 19 is a sequence diagram of an example of a process in which the print setting screen (desktop UI) is displayed and subsequently the setting set is registered.

Following step S1013, the user performs an operation for registering the function information in the print setting screen (desktop UI) (step S1901). That is, for example, the user performs a registration operation for registering (adding) a setting set. In the following description, it is assumed that the user has performed an operation for registering a setting set.

Note that the registration of the function information is not limited to the registration of the setting set. The registration of the function information may be the registration of an image used for a watermark, the registration of an image to be stamped on a print surface, and the registration of an image used for background pattern printing, etc. In this manner, the registration of the function information is to register the settings of various functions uniquely provided by the vendor.

When the operation of registering the function information is performed by the user, the display unit 601 accepts the registration operation (step S1902). Then, the display unit 601 requests the function managing unit 602 to register the function information (step S1903). The function information registration request includes, for example, the function information created according to the user's registration operation (that is, function information in which a setting set is defined).

Upon receiving the function information registration request, the function managing unit 602 saves the function information included in the registration request, in the function information storage unit 510 (step S1904).

Furthermore, the function managing unit 602 saves the function information included in the registration request, in the shared storage unit 450 (step S1905). Accordingly, the function information registered by the user can be shared between the extension configurator 313 and the store device application 304.

Next, the function managing unit 602 requests the image generating unit 605 to generate an image representing the setting set defined in the function information (step S1906). Note that the image generation request includes, for example, the function information saved in the function information storage unit 510 in step S1904.

Upon receiving the image generation request, the image generating unit 605 generates image data of an icon representing the setting set defined in the function information, based on the function information included in the generation request (step S1907). Here, for example, the image generating unit 605 generates image data according to the print setting defined at "settings" in the function information and the corresponding setting value.

Note that, for example, the image generating unit 605 may refer to a predetermined table in which a print setting and a corresponding setting value are associated with image data, and then acquire the image data from the predetermined table. Such a table may be defined in advance in, for example, a program or a module, etc., that implements the image generating unit 605.

Next, the image generating unit 605 saves the image data generated in step S1907, in the function information storage unit 510 in association with the function information stored in step S1904 (step S1908).

As described above, when the function information is registered in the vendor-specific print setting screen (desktop UI), the client device 10 can register the function information in the function information storage unit 510.

Furthermore, for example, when function information, in which a setting set, etc., is defined, is registered, the client device 10 can generate image data such as an icon representing the setting set. Accordingly, the client device 10 can display an icon, etc., representing the setting set in the vendor-specific print setting screen (desktop UI).

<<Display of Print Setting Screen (Store Application UI) and Registration of Function Information—Third Embodiment>>

Figure 20:
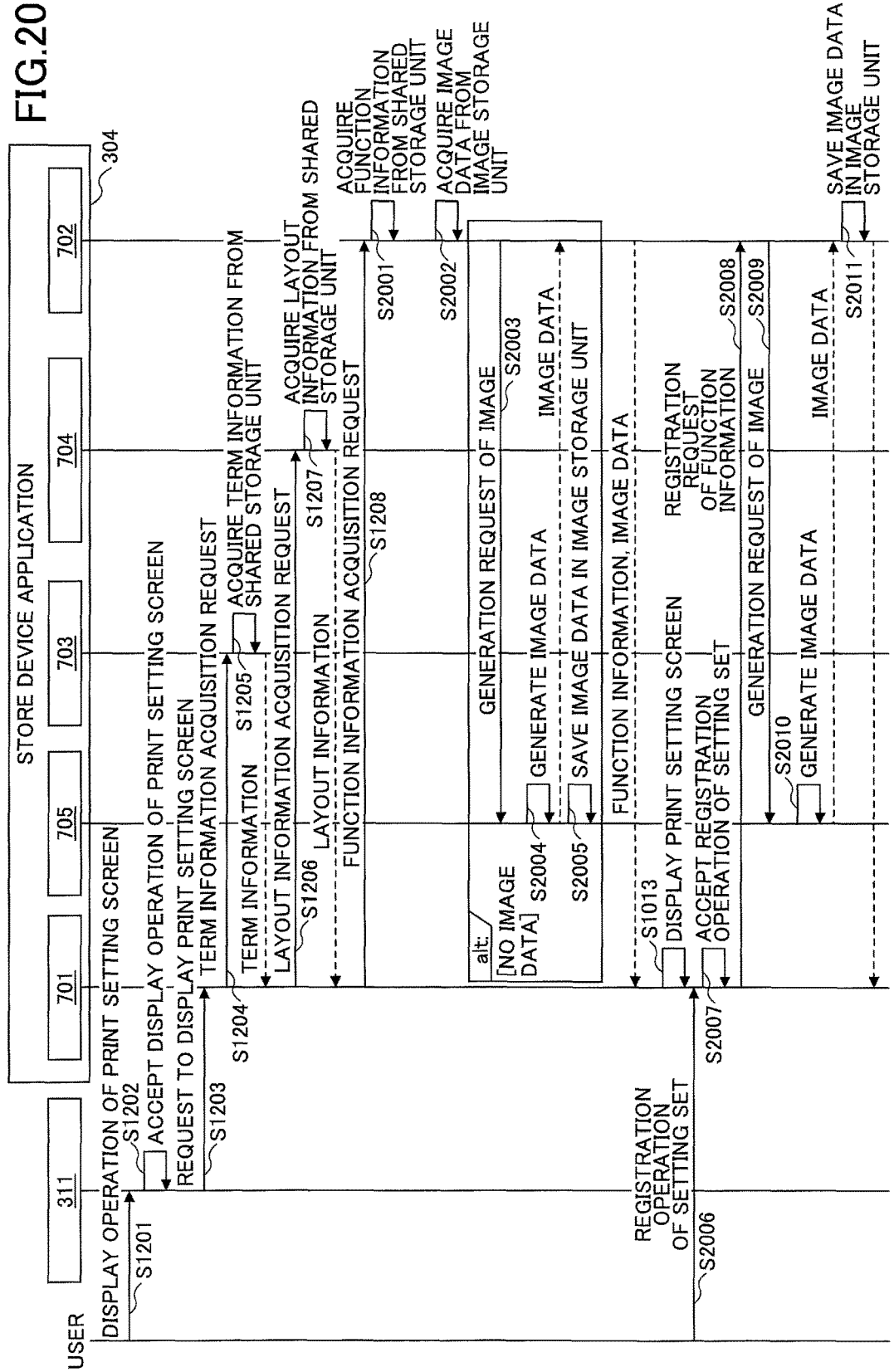
FIG. 20 is a sequence diagram of an example of a process of displaying the print setting screen (store application UI) and subsequently registering a setting set according to the third embodiment of the present invention.

Next, by referring to FIG. 20, a description will be given of a process in the case where the user of the client device 10 displays the vendor-specific print setting screen (store application UI) from the store application 311, and subsequently registers the function information (setting set). FIG. 20 is a sequence diagram of an example of a process of displaying the print setting screen (store application UI) and subsequently registering a setting set.

Following step S1208, upon receiving the function information acquisition request, the function managing unit 702 acquires the function information from the shared storage unit 450 (step S2001). That is, the function managing unit 702 acquires the function information saved in the shared storage unit 450 by the extension configurator 313 in step S1012 of FIG. 10.

Next, the function managing unit 702 acquires, from the image storage unit 460, the image data stored in association with the function information acquired in step S2001 (step S2002).

Here, when image data stored in association with the function information acquired in step S2001 is not stored in the image storage unit 460, the store device application 304 executes the processes of steps S2003 through S2005.

That is, first, the function managing unit 702 requests the image generating unit 705 to generate an image (step S2003). Note that the image generation request includes, for example, the function information acquired from the function information storage unit 510 in step S2202.

Next, upon receiving the image generation request, the image generating unit 705 generates image data of an icon representing the setting set defined in the function information, based on the function information included in the generation request (step S2004). Here, for example, the image generating unit 705 generates image data according to the print setting defined at "settings" in the function information and the corresponding setting value.

Note that, for example, the image generating unit 705 may refer to a predetermined table in which the print setting and the corresponding setting value are associated with the image data, and then acquire the image data from the table.

Next, the image generating unit 705 saves the image data generated in step S2004, in the image storage unit 460 in association with the function information acquired in step S2001 (step S2005). Then, the image generating unit 705 returns the generated image data to the function managing unit 702.

Subsequently, the function managing unit 702 returns the function information acquired in step S2001 and the image data acquired in step S2002 or the image data returned from the image generating unit 705, to the display unit 701.

Accordingly, for example, in the vendor-specific print setting screen (store application UI), an icon representing a setting set, etc., can be displayed.

Next, the user performs an operation for registering the function information in the print setting screen (store application UI) (step S2006). That is, for example, the user performs a registration operation for registering (adding) a setting set. In the following description, it is assumed that the user has performed an operation for registering a setting set.

When the function information registration operation is performed by the user, the display unit 701 accepts the registration operation (step S2007). Then, the display unit 701 requests the function managing unit 702 to register the function information (step S2008). Note that the function information registration request includes, for example, function information created according to the user's registration operation (that is, function information in which a setting set is defined).

Upon receiving the function information registration request, the function managing unit 702 requests the image generating unit 705 to generate an image representing the setting set defined in the function information included in the registration request (step S2009). Note that the image generation request includes, for example, function information created according to the user's registration operation.

Upon receiving the image generation request, the image generating unit 705 generates image data of an icon representing the setting set defined in the function information, based on the function information included in the generation request (step S2010). Here, for example, the image generating unit 705 generates image data according to the print setting defined at "settings" in the function information and the corresponding setting value. Then, the image generating unit 705 returns the generated image data to the function managing unit 702.

The image generating unit 705 may refer to a predetermined table in which, for example, the print setting and the corresponding setting value are associated with the image data, and then acquire the image data from the table.

Upon receiving the image data from the image generating unit 705, the function managing unit 702 saves the image data in the image storage unit 460 in association with the function information created according to the user's registration operation (step S2011).

According to the above, when function information defining, for example, a setting set, etc., is registered in the vendor-specific print setting screen (store application UI), the client device 10 is able to generate image data such as an icon representing the setting set. Accordingly, the client device 10 can display an icon, etc., representing the setting set in the vendor-specific print setting screen (store application UI).

Fourth Embodiment

Next, a fourth embodiment will be described. In the fourth embodiment, for example, any image (for example, a stamp image, etc.) can be shared as function information between the extension configurator 313 and the store device application 304. Note that the stamp image is an image printed on a print surface of printed matter.

Note that in the fourth embodiment, the portions having substantially the same functions as those of the first embodiment and the portions performing the same processes as those of the first embodiment are denoted by the same reference numerals as those in the first embodiment, and descriptions of these portions are omitted.

<Functional Configuration—Fourth Embodiment>

Figure 21:
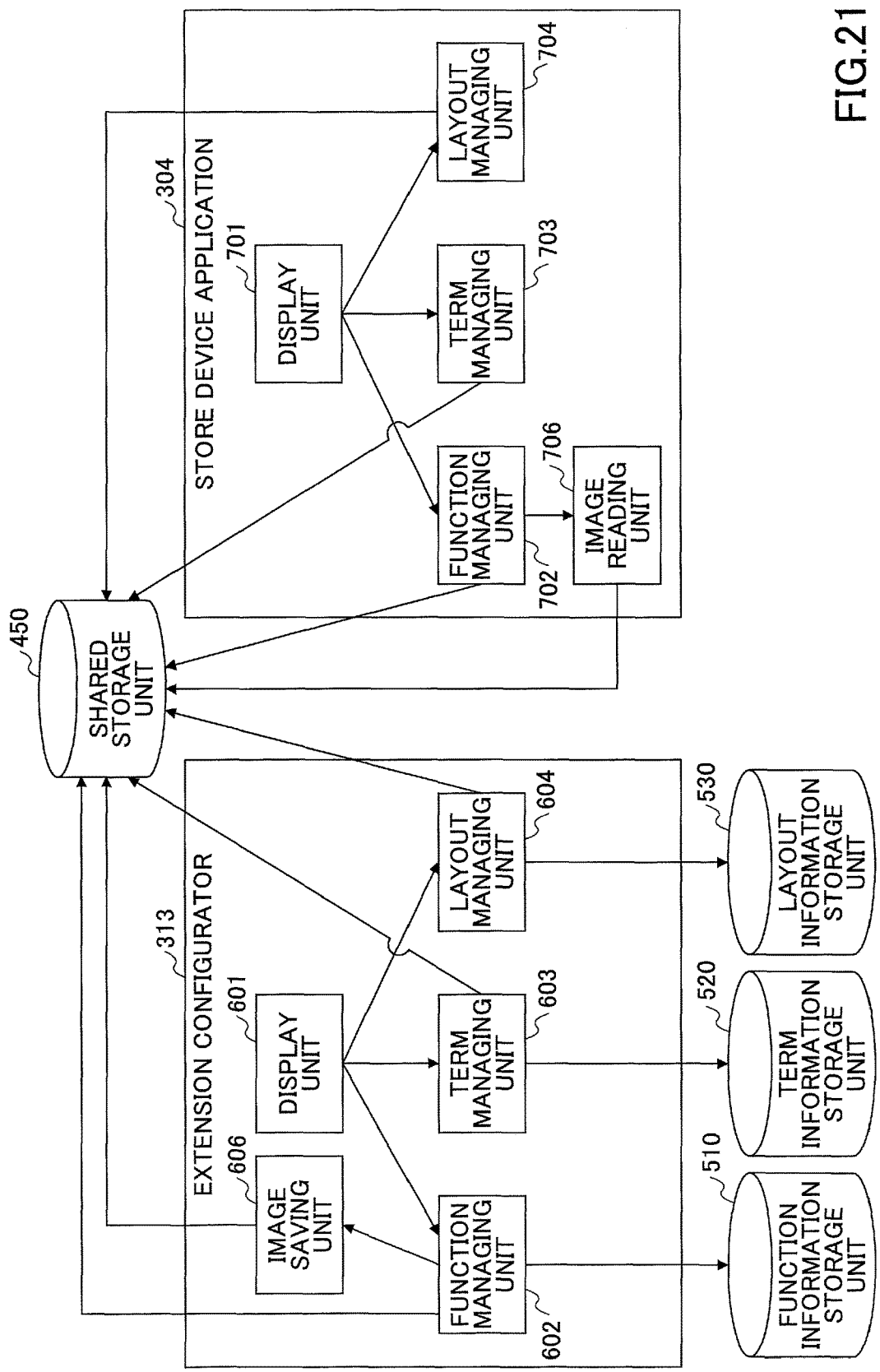
FIG. 21 is a functional block diagram of an example of the client device according to a fourth embodiment of the present invention.

First, a functional configuration of the client device 10 according to the fourth embodiment will be described by referring to FIG. 21. FIG. 21 is a functional block diagram of an example of the client device 10 according to the fourth embodiment.

As illustrated in FIG. 21, the extension configurator 313 of the client device 10 according to the fourth embodiment includes an image saving unit 606. Furthermore, the store device application 304 of the client device 10 according to the fourth embodiment includes an image reading unit 706.

The image saving unit 606 of the extension configurator 313 acquires image data related to a request, in response to the request (image saving request) from the function managing unit 602, and then converts the acquired image data into a predetermined data format, and saves the image data in the shared storage unit 450.

Here, the image saving unit 606 encodes the acquired image data into character data by, for example, Base 64, etc. Note that in the following description, it is assumed that the image saving unit 606 encodes the image data into character data by the Base 64. Therefore, in the shared storage unit 450, the character data encoded by the image saving unit 606 is saved.

However, the present embodiment is not limited as such, and the image saving unit 606 may convert the image data into a data format that can be saved in, for example, the UserPropertyBag 430 and the QueuePropertyBag 420, etc., and then save the converted data in the shared storage unit 450. This is because the UserPropertyBag 430 and the QueuePropertyBag 420, etc., cannot store image data.

The image reading unit 706 of the store device application 304 acquires the character data from the shared storage unit 450, in response to a request (image reading request) from the function managing unit 702, and converts the acquired character data into image data. That is, the image reading unit 706 decodes the character data acquired from the shared storage unit 450, into image data, by the Base 64.

Note that in the example illustrated in FIG. 21, the extension configurator 313 includes the image saving unit 606, and the store device application 304 includes the image reading unit 706; however, the present embodiment is not limited as such. For example, both the extension configurator 313 and the image saving unit 606 may include an image saving unit that acquires and converts image data, and an image reading unit that converts and saves image data.

<Process Details—Fourth Embodiment>

Next, the details of the process performed by the client device 10 according to the fourth embodiment will be described.

<<Display of Print Setting Screen (Desktop UI) and Registration of Function Information—Fourth Embodiment>>

Figure 22:
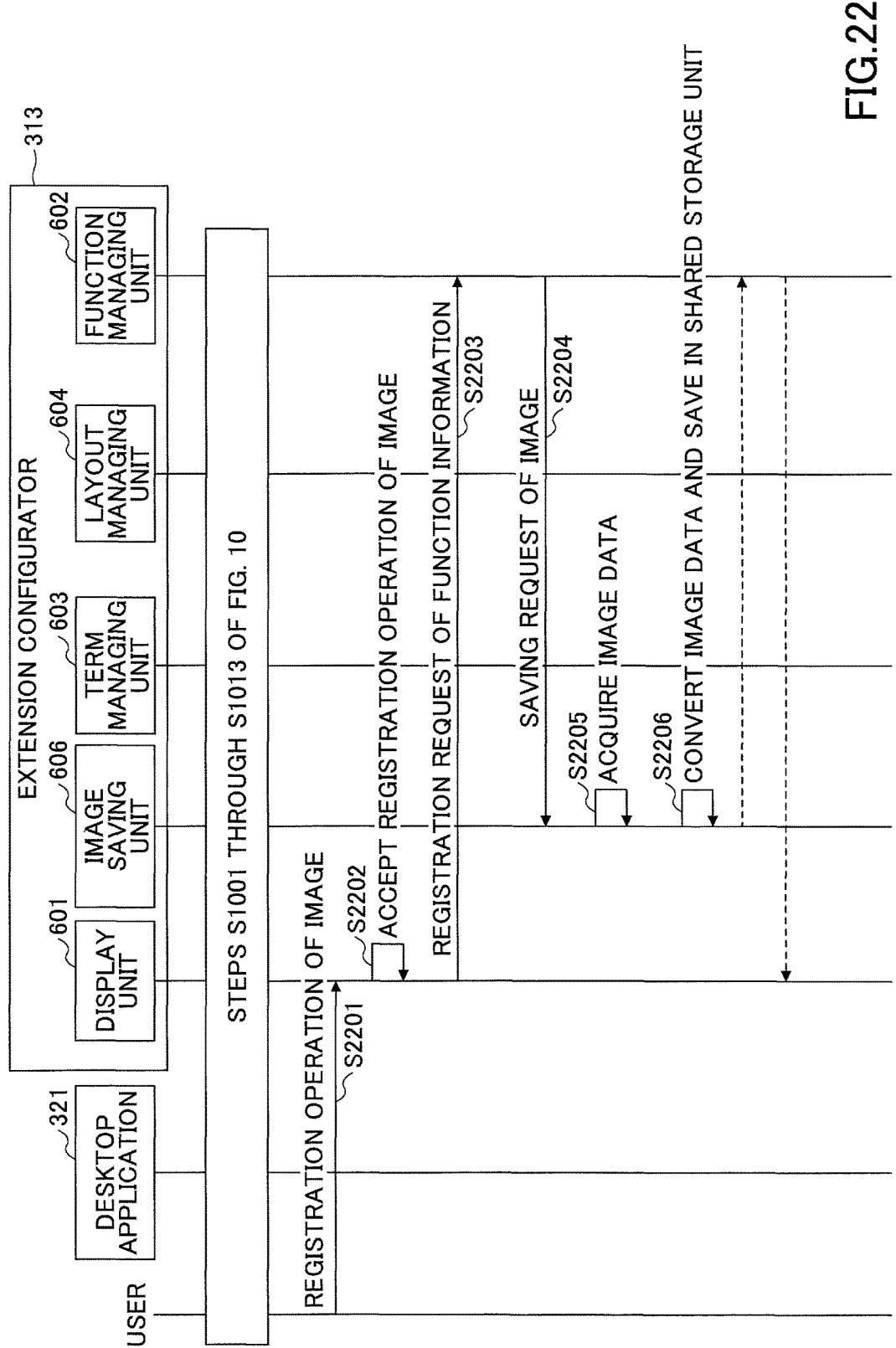
FIG. 22 is a sequence diagram of an example of a process in which the print setting screen (desktop UI) is displayed and subsequently registering a stamp image according to the fourth embodiment of the present invention.

First, by referring to FIG. 22, a description will be given of a process in the case where the user of the client device 10 displays the vendor-specific print setting screen (desktop UI) from the desktop application 321, and subsequently registers the function information (stamp image). FIG. 22 is a sequence diagram of an example of a process in which the print setting screen (desktop UI) is displayed and subsequently registering a stamp image.

Following step S1013, the user performs an operation for registering function information in the vendor-specific print setting screen (desktop UI) (step S2201). That is, the user performs an operation for registering (adding) a stamp image by specifying, for example, a file path indicating the storage location of the image data of the stamp image. In the following description, it is assumed that the user has performed an operation for registering a stamp image.

When the function information registration operation is performed by the user, the display unit 601 accepts the registration operation (step S2202). Then, the display unit 601 requests the function managing unit 602 to register the function information (step S2203). Note that the function information registration request includes, for example, a file path, etc., indicating a storage location of the image data of the stamp image.

Upon receiving the function information registration request, the function managing unit 602 requests the image saving unit 606 to save the image (step S2204). Note that the image saving request includes a file path, etc., indicating the storage location of the image data of the stamp image.

Upon receiving the image saving request, the image saving unit 606 acquires the image data indicated by the file path included in the saving request (step S2205). Note that the file path may be the storage location of the image data stored in the HDD 108 of the client device 10, or the storage location of the image data stored in a storage device, etc., coupled to the client device 10 via the network.

Next, the image saving unit 606 encodes the image data acquired in step S2205, into character data by the Base 64, and saves the character data in the shared storage unit 450 (step S2206). Accordingly, the image data can be shared between the extension configurator 313 and the store device application 304.

<<Display of Print Setting Screen (Store Application UI) and Registration of Function Information—Fourth Embodiment>>

Figure 23:
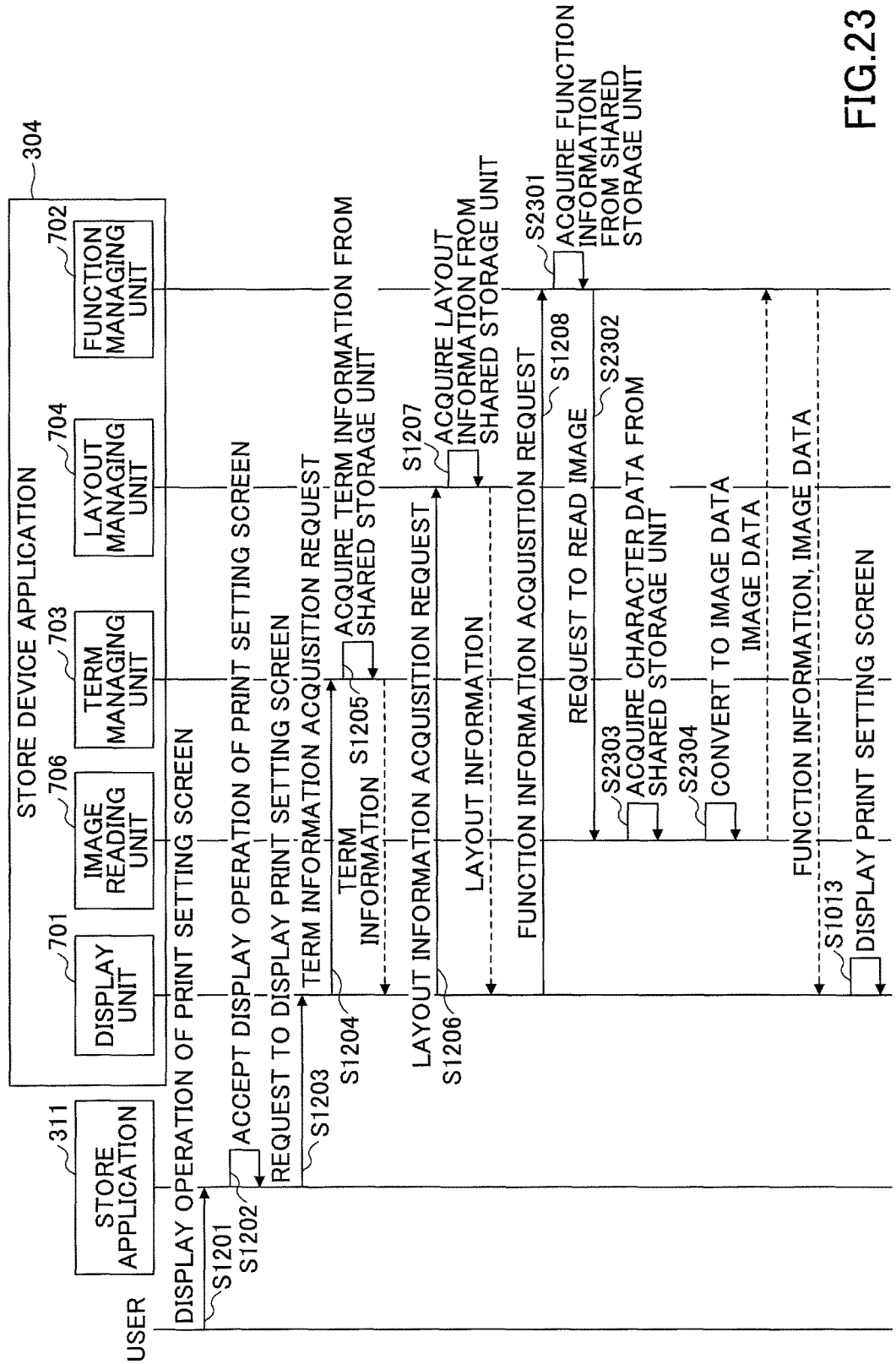
FIG. 23 is a sequence diagram of an example of a process of displaying the print setting screen (store application UI) according to the fourth embodiment of the present invention.

Next, the process performed when the user of the client device 10 displays the vendor-specific print setting screen (store application UI) from the store application 311 will be described by referring to FIG. 23. FIG. 23 is a sequence diagram of an example of a process of displaying the print setting screen (store application UI).

Following step S1208, upon receiving the function information acquisition request, the function managing unit 702 acquires the function information from the shared storage unit 450 (step S2301). That is, the function managing unit 702 acquires the function information saved in the shared storage unit 450 by the extension setting unit 313 in step S1012 of FIG. 10.

Next, the function managing unit 702 requests the image reading unit 706 to read the image (step S2302).

Next, upon receiving the image reading request, the image reading unit 706 acquires the character data from the shared storage unit 450 (step S2303).

Next, the image reading unit 706 decodes the character data acquired in step S2303, into image data, by the Base 64 (step S2304). Then, the image reading unit 706 returns the image data to the function managing unit 702. Subsequently, the function managing unit 702 returns the function information and the image data to the display unit 701.

As described above, for example, when a stamp image, etc., is registered in the print setting screen (desktop UI), the client device 10 can use the stamp image also in the print setting screen (store application UI). Similarly, for example, when a stamp image, etc., is registered in the print setting screen (store application UI), the client device 10 can use the stamp image also in the print setting screen (desktop UI).

Fifth Embodiment

Next, a fifth embodiment will be described. In the fifth embodiment, when a plurality of printer drivers 303 are installed in the client device 10, the term information and the layout information, etc., of the respective printer drivers 303 are stored in different shared storage units 450. Accordingly, in a case where one store device application 304 is used for a plurality of printer drivers 303, the store device application 304 can display a different print setting screen (store application UI) for each printer driver 303.

Note that in the fifth embodiment, the portions having substantially the same functions as those of the first embodiment and the portions performing the same processes as those of the first embodiment are denoted by the same reference numerals as those of the first embodiment, and descriptions of these portions are omitted.

<Software Configuration of Client Device 10—Fifth Embodiment>

Figure 24:
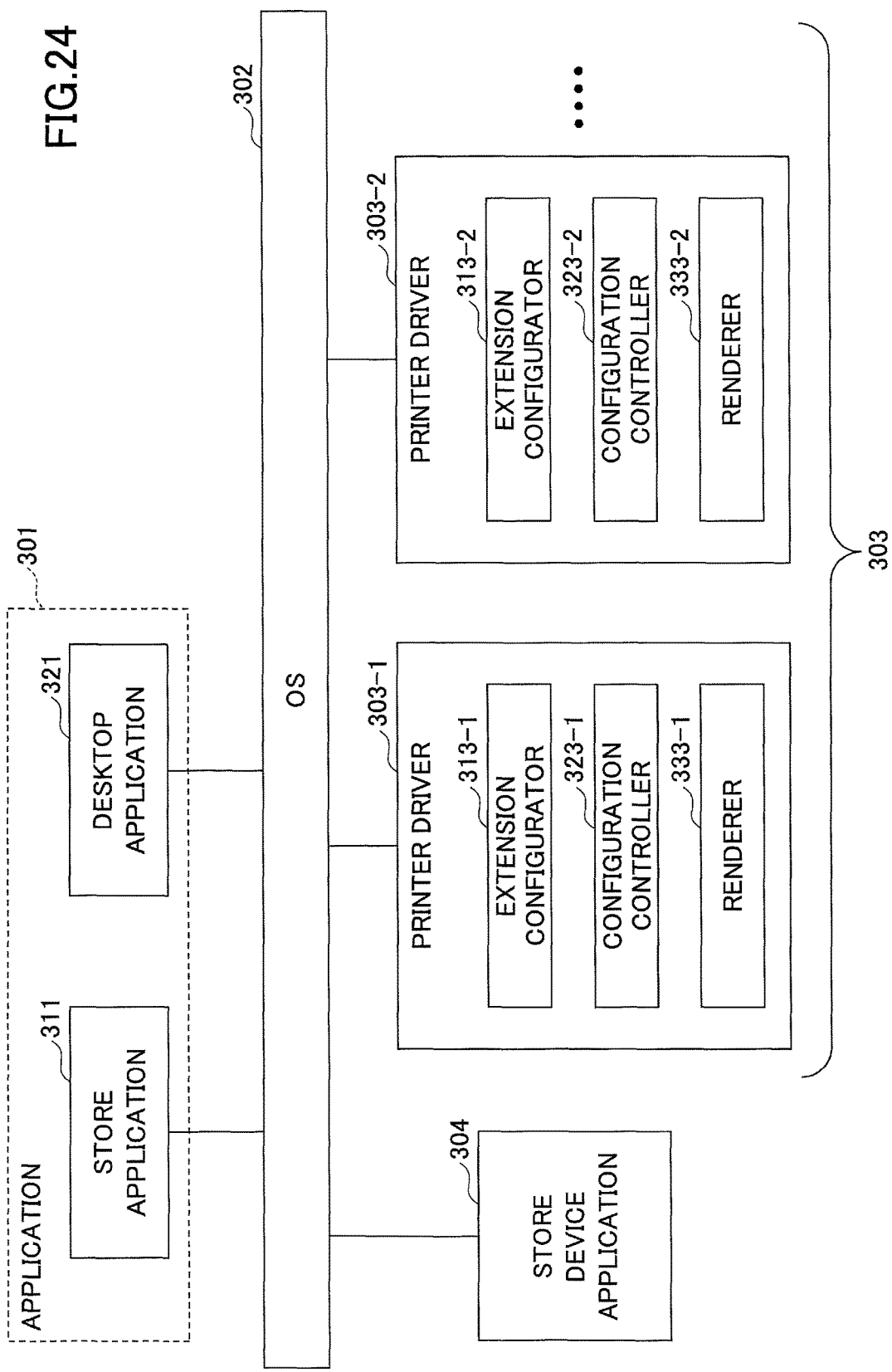
FIG. 24 is a diagram illustrating a software configuration of an example of the client device according to a fifth embodiment of the present invention.

First, a software configuration of the client device 10 according to the fifth embodiment will be described by referring to FIG. 24. FIG. 24 is a diagram illustrating a software configuration of an example of the client device 10 according to the fifth embodiment.

As illustrated in FIG. 24, the client device 10 according to the fifth embodiment includes a printer driver 303-1 and a printer driver 303-2, etc., that use the same store device application 304. In the fifth embodiment, when the printer driver 303-1 and the printer driver 303-2, etc., are not distinguished from each other, they are denoted as the "printer driver 303".

The printer driver 303-1 includes an extension configurator 313-1, a configuration controller 323-1, and a renderer 333-1. Similarly, the printer driver 303-2 includes an extension configurator 313-2, a configuration controller 323-2, and a renderer 333-2.

In the fifth embodiment, when the extension configurator 313-1 and the extension configurator 313-2 are not distinguished from each other, they are denoted as the "extension configurator 313". Similarly, when configuration controller 323-1 and configuration controller 323-2 are not distinguished from each other, they are denoted as the "configuration controller 323". Similarly, when the renderer 333-1 and the renderer 333-2 are not distinguished from each other, they are denoted as the "renderer 333".

Note that the functions of the extension configurator 313, the configuration controller 323, and the renderer 333 are the same as those described by referring to FIG. 4.

<Functional Configuration—Fifth Embodiment>

Figure 25:
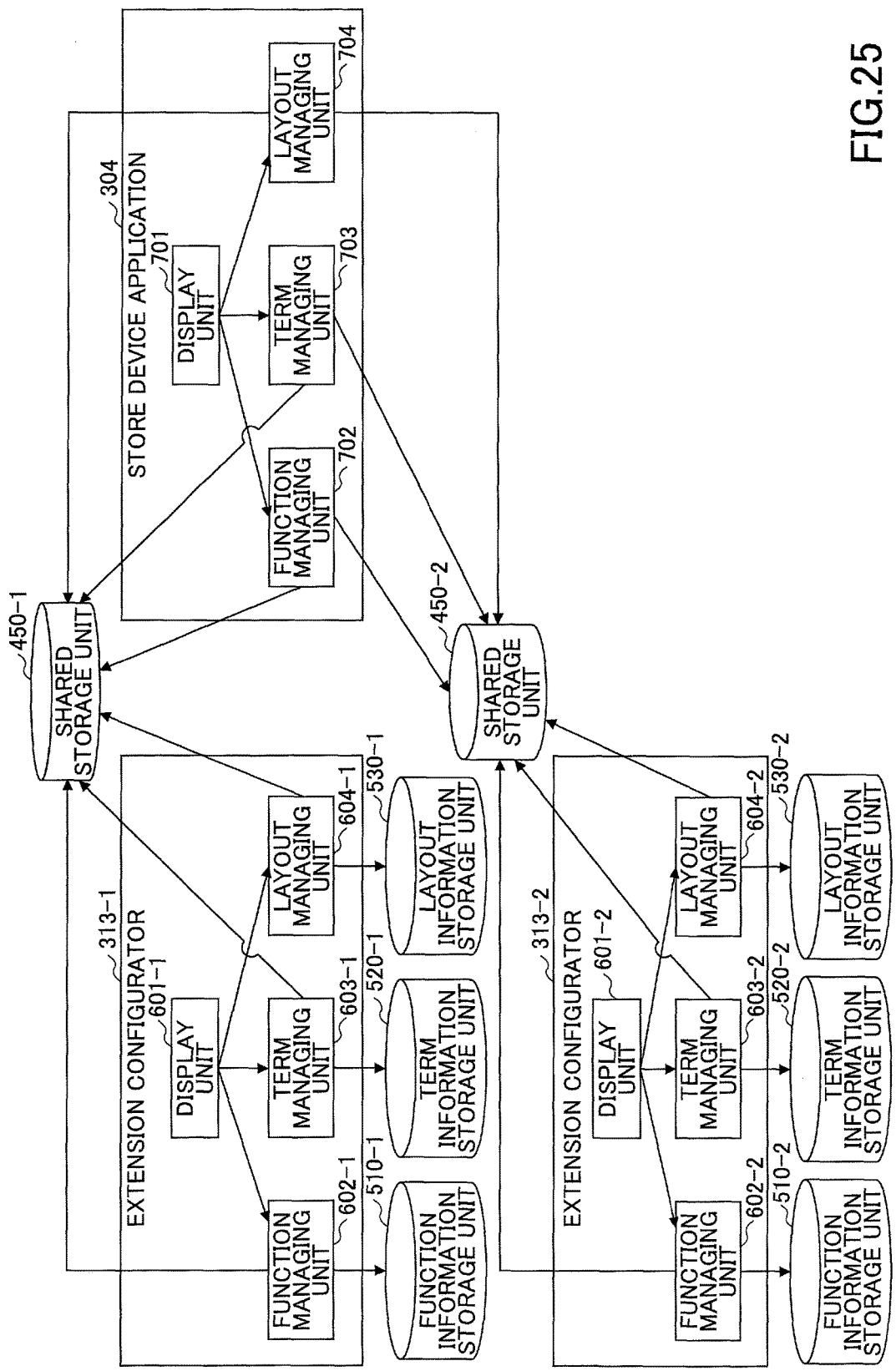
FIG. 25 is a functional block diagram of an example of the client device according to the fifth embodiment of the present invention.

Next, the functional configuration of the client device 10 according to the fifth embodiment will be described by referring to FIG. 25. FIG. 25 is a functional block diagram of an example of the client device 10 according to the fifth embodiment.

As illustrated in FIG. 25, the extension configurator 313-1 of the client device 10 according to the fifth embodiment includes a display unit 601-1, a function managing unit 602-1, a term managing unit 603-1, and a layout managing unit 604-1. Furthermore, the client device 10 according to the fifth embodiment includes a function information storage unit 510-1, a term information storage unit 520-1, a layout information storage unit 530-1, and a shared storage unit 450-1. These storage units are used by the extension configurator 313-1.

Similarly, the extension configurator 313-1 of the client device 10 according to the fifth embodiment includes a display unit 601-2, a function managing unit 602-2, a term managing unit 603-2, and a layout managing unit 604-2. Furthermore, the client device 10 according to the fifth embodiment includes a function information storage unit 510-2, a term information storage unit 520-2, a layout information storage unit 530-2, and a shared storage unit 450-2. These storage units are used by the extension configurator 313-2.

In the fifth embodiment, when the display unit 601-1 and the display unit 601-2 are not distinguished from each other, they are denoted as the "display unit 601". Similarly, with regard to the other functional units, when the function managing unit 602-1 and the function managing unit 602-2 are not distinguished from each other, they are denoted as the "function managing unit 602". When the term managing unit 603-1 and the term managing unit 603-2 are not distinguished from each other, they are denoted as the "term managing unit 603". When the layout managing unit 604-1 and the layout managing unit 604-2 are not distinguished from each other, they are denoted as the "layout managing unit 604".

Furthermore, when the function information storage unit 510-1 and the function information storage unit 510-2 are not distinguished from each other, they are denoted as the "function information storage unit 510". Similarly, with regard to the other functional units, when the term information storage unit 520-1 and the term information storage unit 520-2 are not distinguished from each other, they are denoted as the "term information storage unit 520". When the layout information storage unit 530-1 and the layout information storage unit 530-2 are not distinguished from each other, they are denoted as the "layout information storage unit 530". When the shared storage unit 450-1 and the shared storage unit 450-2 are not distinguished from each other, they are denoted as the "shared storage unit 450".

Note that the function of each of the above functional units and the information stored in each of the above storage units are as described by referring to FIG. 6.

As described above, the client device 10 according to the fifth embodiment includes the shared storage unit 450 used by the extension configurator 313 of the printer driver 303, for each of the plurality of printer drivers 303.

<Process Details—Fifth Embodiment>

Next, the details of the process performed by the client device 10 according to the fifth embodiment will be described.

<<Display of Print Setting Screen (Store Application UI)—Fifth Embodiment>>

Figure 26:
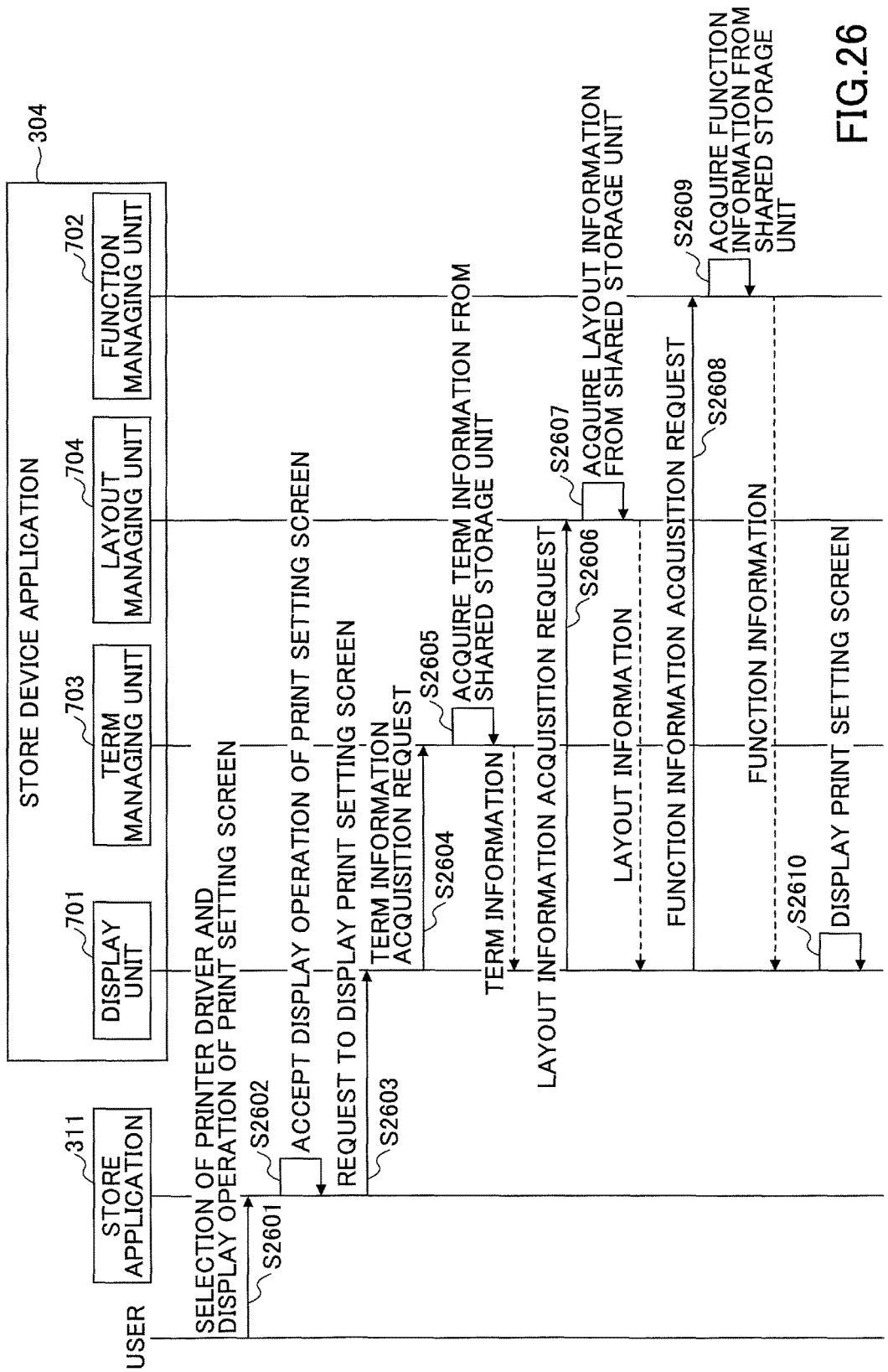
FIG. 26 is a sequence diagram of an example of process of displaying the print setting screen (store application UI) according to the fifth embodiment of the present invention.

Next, a description is given of a process in which the user of the client device 10 selects one printer driver 303 out of the plurality of printer drivers 303 from the store application 311, to display the vendor-specific print setting screen (store application UI), by referring to FIG. 26. FIG. 26 is a sequence diagram of an example of process of displaying the print setting screen (store application UI) according to the fifth embodiment. Note that in the following description, for example, it is assumed that when installing the printer driver 303, the term information, the layout information, and the function information of the printer driver 303 to be installed are saved in the shared storage unit 450 used by the extension setting unit 313 of the printer driver 303 to be installed.

First, the user selects one printer driver 303 out of the plurality of printer drivers 303 from the store application 311, and then performs a display operation for displaying the print setting screen (step S2601). That is, for example, the user selects the printer driver 303 to be used from among the plurality of printer drivers 303 in the print screen displayed by instructing printing in the store application 311. Then, the user performs an operation for displaying the vendor-specific print setting screen.

When the user selects the printer driver 303 and performs the operation for displaying the print setting screen, the store application 311 accepts the display operation (step S2602). Then, the store application 311 requests the display unit 701 of the store device application 304 to display the vendor-specific print setting screen (step S2603).

Next, when the display unit 701 of the store device application 304 receives the display request to display the vendor-specific print setting screen, the display unit 701 of the store device application 304 requests the term managing unit 703 to acquire the term information (step S2604).

Upon receiving the term information acquisition request, the term managing unit 703 acquires the term information from the shared storage unit 450 (step S2605). That is, the term managing unit 703 acquires the term information saved in the shared storage unit 450 by the extension configurator 313 of the printer driver 303 selected by the user.

The term managing unit 703 then returns the term information acquired in step S2605, to the display unit 701.

Note that the term managing unit 703 can identify the shared storage unit 450 used by the extension configurator 313 of the printer driver 303 selected by the user, from among a plurality of the shared storage units 450, from the argument PrintTaskSettingsActivatedEventArgs transferred from the OS 302 at the time of the activation of the store device application 304.

Next, the display unit 701 requests the layout managing unit 704 to acquire layout information (step S2606).

Upon receiving the layout information acquisition request, the layout managing unit 704 acquires the layout information from the shared storage unit 450 (step S2607). That is, the layout managing unit 704 acquires the layout information saved in the shared storage unit 450 by the extension configurator 313 of the printer driver 303 selected by the user.

The layout managing unit 704 then returns the layout information acquired in step S2607, to the display unit 701.

Note that, similar to the term managing unit 703, the layout managing unit 704 can identify the shared storage unit 450 used by the extension configurator 313 of the printer driver 303 selected by the user from, for example, PrintTaskSettingsActivatedEventArgs.

Next, the display unit 701 requests the function managing unit 702 to acquire the function information (step S2608).

Upon receiving the function information acquisition request, the function managing unit 702 acquires the function information from the shared storage unit 450 (step S2609). That is, the function managing unit 702 acquires the function information saved in the shared storage unit 450 by the extension configurator 313 of the printer driver 303 selected by the user.

The function managing unit 702 then returns the function information acquired in step S2609, to the display unit 701.

Similar to the term managing unit 703, the function managing unit 702 can identify the shared storage unit 450 used by the extension configurator 313 of the printer driver 303 selected by the user from, for example, PrintTaskSettingsActivatedEventArgs.

Upon receiving the term information, the layout information, and the function information, the display unit 701 displays the vendor-specific print setting screen (store application UI) based on these pieces of information (step S2610). Accordingly, the display unit 701 can display the vendor-specific print setting screen (store application UI) corresponding to the printer driver 303 selected by the user.

That is, when the user selects the printer driver 303-1 in step S2601, the display unit 701 displays, for example, the print setting screen (store application UI) G310 illustrated in FIG. 27A. On the other hand, when the user selects the printer driver 303-2 in step S2601, the display unit 701 displays, for example, the print setting screen (store application UI) G320 illustrated in FIG. 27B. In this way, the display unit 701 can display different print setting screens (store application UI) according to the printer driver 303 selected by the user.

As described above, in the client device 10 according to the fifth embodiment, when a plurality of printer drivers 303 use the same store device application 304, a print setting screen (store application UI) corresponding to the printer driver 303 selected by the user, can be displayed.

Therefore, in the client device 10 according to the fifth embodiment, for example, different print setting screens (store application UI) can be displayed for the printer driver 303 for production printing, and for the printer driver 303 for ink jet printing.

Sixth Embodiment

Next, a sixth embodiment will be described. In the sixth embodiment, in the case where the extension configurator 313 of the printer driver 303 and the store device application 304 include modules that implement a predetermined function by the same processing contents (logic), even if the versions of these modules are different, the same function can be provided by these modules. Note that the printer driver 303 and the store device application 304 can install modules or upgrade the modules separately (that is, at different timings). Therefore, the versions of these modules may differ between the printer driver 303 and the store device application 304.

Figure 28A:
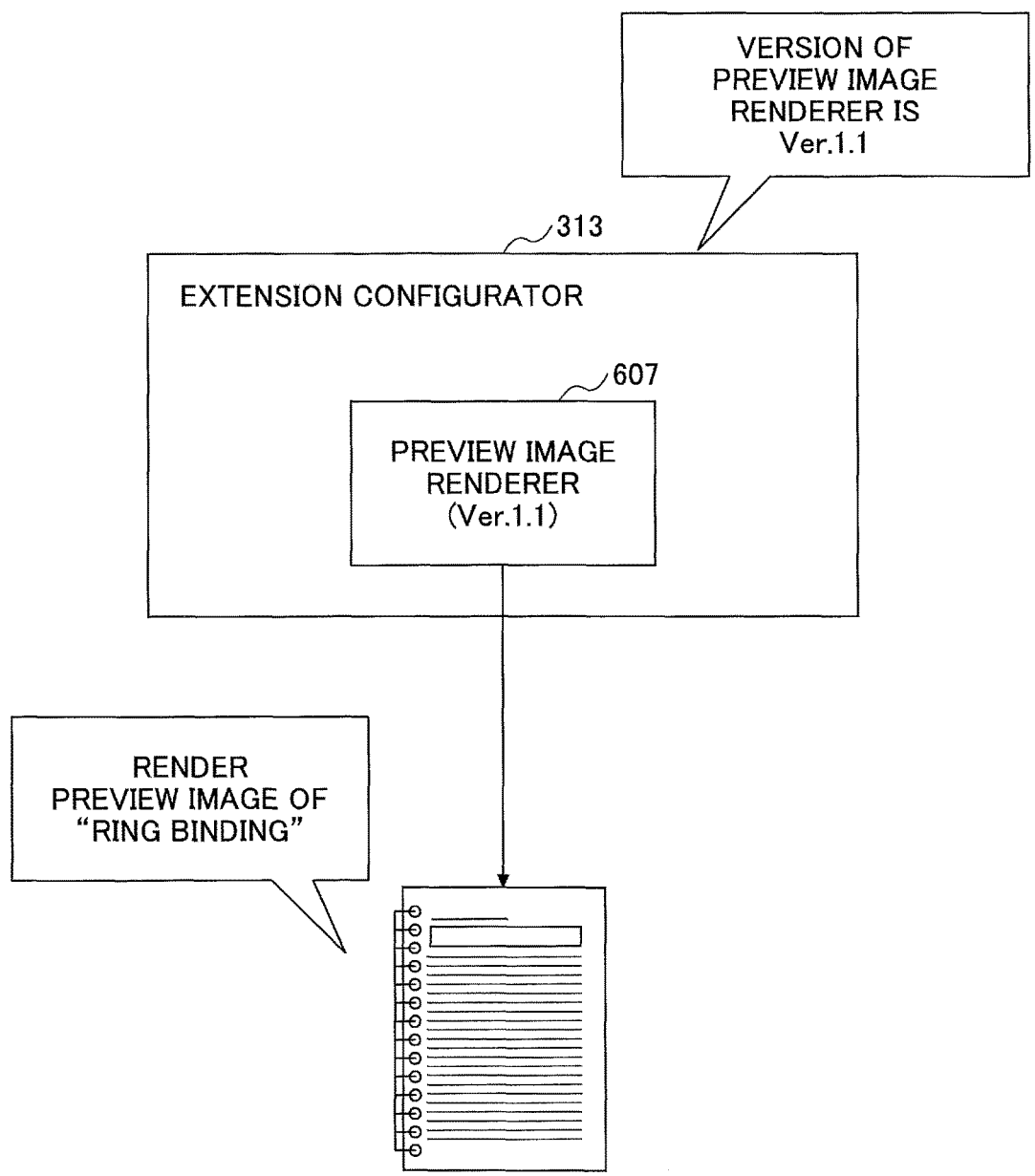
FIGS. 28A and 28B illustrate examples of preview images in a case where the an extension configurator and a store device application include preview image renderers of different versions, according to a sixth embodiment of the present invention.
Figure 28B:
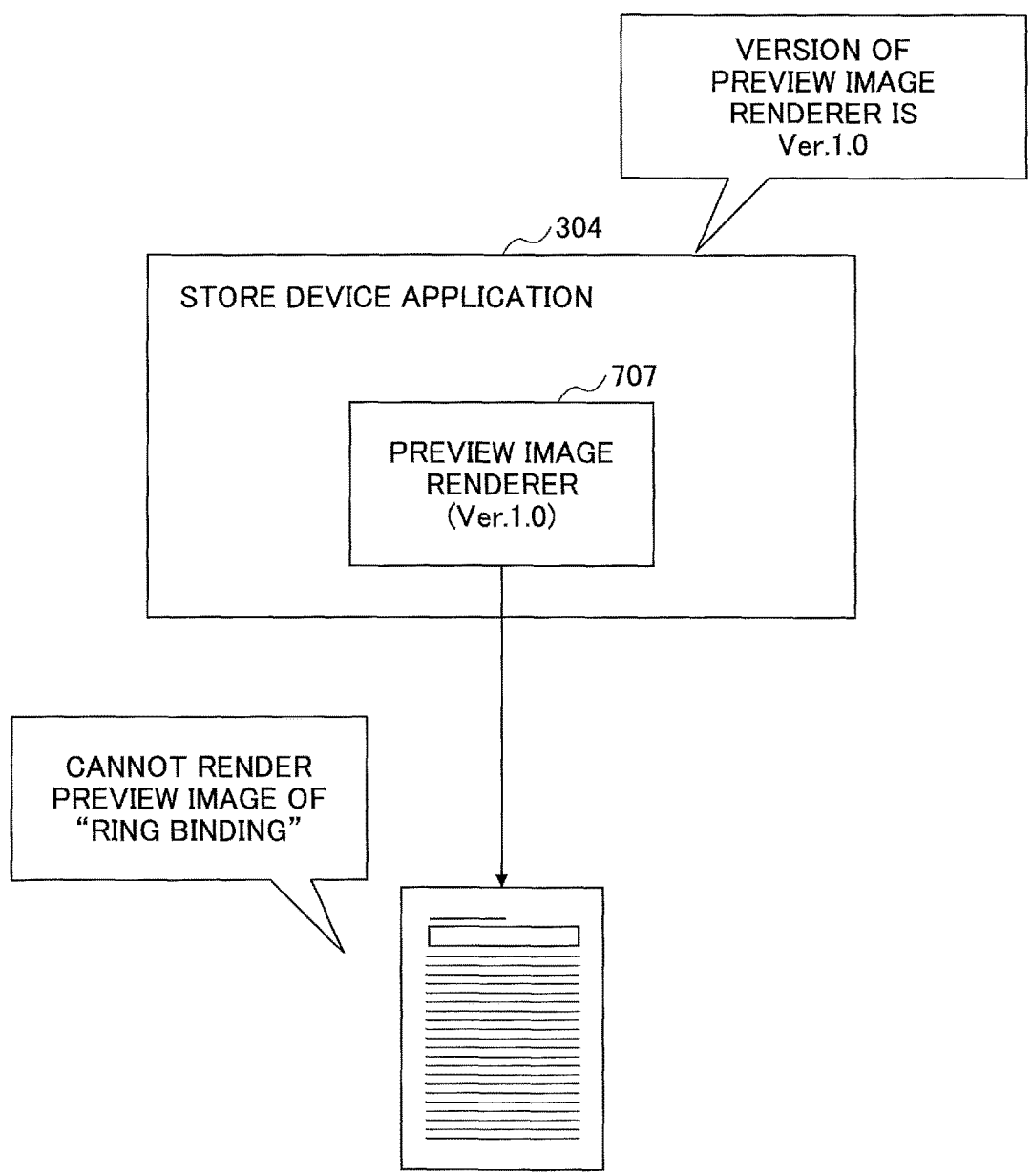

Here, as illustrated in FIGS. 28A and 28B, the extension configurator 313 and the store device application 304 respectively include a preview image renderer 607 and a preview image renderer 707, which are for rendering a preview image according to print settings set by the user. The preview image renderer 607 and the preview image renderer 707 are respectively implemented by different modules.

In this case, it is assumed that the version (ver. 1.0) of the module implementing the preview image renderer 707 is older than the version (ver. 1.1) of the module implementing the preview image renderer 607.

In such a case, for example, the preview image of "ring binding", which can be rendered by the preview image renderer 607, cannot be rendered by the preview image renderer 707 in some cases. That is, for example, when the function of rendering a preview image of "ring binding" is supported in versions from and subsequent to "ver. 1.1", the preview image renderer 707 of ver. 1.0 is unable to render a preview image of "ring binding".

Therefore, the sixth embodiment makes it possible for the preview image renderer 707 to use a function (for example, a function of rendering a preview image of "ring binding"), which can be used by preview image renderer 607 but cannot be used by the preview image renderer 707.

Note that in the sixth embodiment, the portions having substantially the same functions as those of the first and second embodiments and the portions performing the same processes as those of the first and second embodiments are denoted by the same reference numerals as those of the first and second embodiments, and descriptions of these portions are omitted.

<Functional Configuration—Sixth Embodiment>

Figure 29:
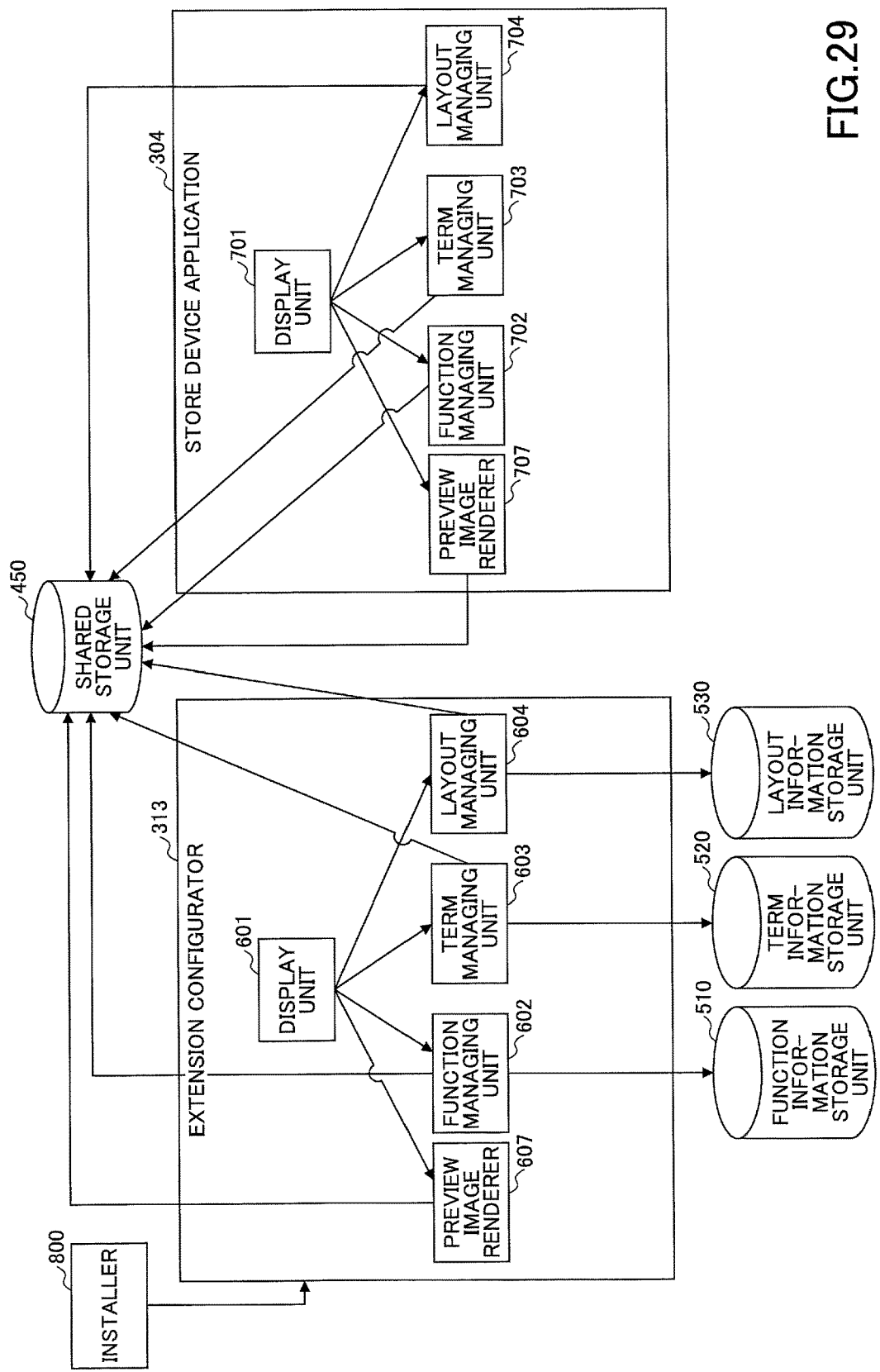
FIG. 29 is a functional block diagram of an example of the client device according to the sixth embodiment of the present invention.

First, a functional configuration of the client device 10 according to the sixth embodiment will be described by referring to FIG. 29. FIG. 29 is a functional block diagram of an example of the client device 10 according to the sixth embodiment.

As illustrated in FIG. 29, the extension configurator 313 of the client device 10 according to the sixth embodiment includes the preview image renderer 607. In addition, the store device application 304 of the client device 10 according to the sixth embodiment includes the preview image renderer 707.

The preview image renderer 607 renders a preview image in the print setting screen (desktop UI) according to rendering method information for rendering a preview image. Similarly, the preview image renderer 707 renders a preview image in the print setting screen (store application UI) according to rendering method information.

In the client device 10 according to the sixth embodiment, the rendering method information is shared between the extension configurator 313 and the store device application 304 by using the shared storage unit 450. Thus, even when the version of the module implementing the preview image renderer 607 is different from the version of the module implementing the preview image renderer 707, the same preview image can be rendered. Said differently, a function (for example, a function of rendering a preview image of "ring binding"), which can be used only in either one of the preview image renderer 607 or the preview image renderer 707, becomes usable in the other one of the preview image renderer 607 or the preview image renderer 707.

<Process Details—Sixth Embodiment>

Next, the details of the process performed by the client device 10 according to the fifth embodiment will be described.

<<Saving Term Information, Layout Information, Function Information, and Rendering Method Information when Installing Printer Driver 303—Sixth Embodiment>>

Figure 30:
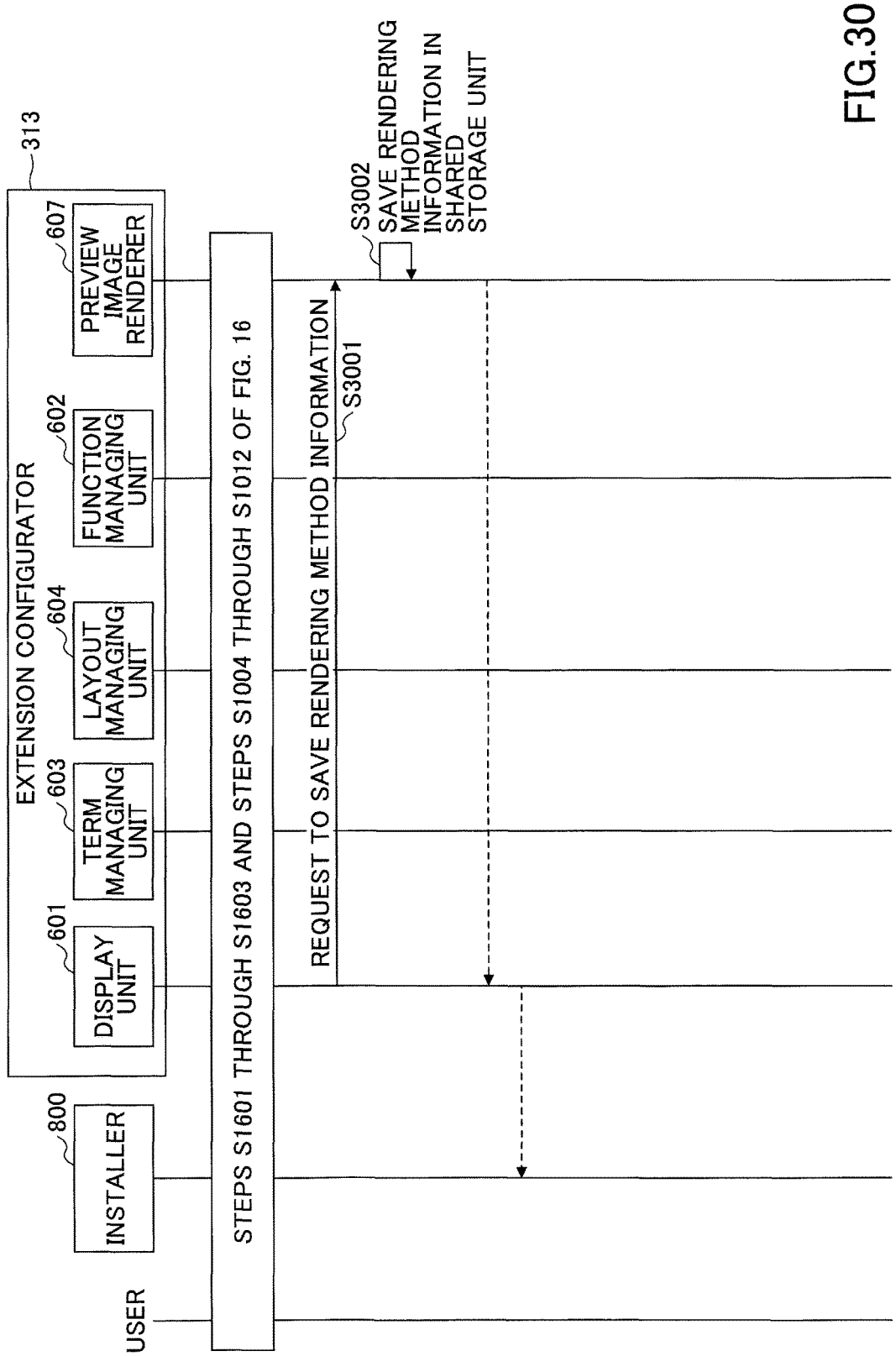
FIG. 30 is a sequence diagram of an example of a process of saving the term information, the layout information, the function information, and the rendering method information in the shared storage unit at the time of installing the printer driver according to the sixth embodiment of the present invention.

First, by referring to FIG. 30, a description will be given of a process in the case where, when installing the printer driver 303, in addition to the term information, the layout information, and the function information, the preview image renderer 607 saves rendering method information used for rendering a preview image, in the shared storage unit 450. FIG. 30 is a sequence diagram of an example of a process of saving the term information, the layout information, the function information, and the rendering method information in the shared storage unit 450 at the time of installing the printer driver 303.

Following step S1012, the display unit 601 requests the preview image renderer 607 to save the rendering method information (step S3001).

Upon receiving the request to save the rendering method information, the preview image renderer 607 saves the rendering method information of a preview image that can be rendered by the preview image renderer 607, in the shared storage unit 450 (step S3002). Here, an example of rendering method information 4100 saved in the shared storage unit 450, is illustrated in FIG. 31.

In the rendering method information 4100 illustrated in FIG. 31, rendering method information of a preview image that can be rendered, is defined for each version by the JSON format. That is, in the rendering method information 4100 illustrated in FIG. 31, the rendering method information "rendering method 1", "rendering method 2", and "rendering method 3" are defined as the rendering method information that can be used when "ver. 1.0" is the version of the module implementing the preview image renderer 607 and the preview image renderer 707. Similarly, in the rendering method information 4100 illustrated in FIG. 31, the rendering method information "rendering method 4" is defined as the rendering method information that can be used when "ver. 1.1" is the version of the module implementing the preview image renderer 607 and the preview image renderer 707. Note that in the rendering method information, parameters indicating a rendering method of the preview image (for example, parameters defining a rendering method of a straight line or a curved line rendered as a preview image), etc., are defined.

As described above, the preview image renderer 607 of the printer driver 303 can save the rendering method information of a preview image that can be rendered by the preview image renderer 607, in the shared storage unit 450, when installing the printer driver 303. Note that other than the timing of installing the printer driver 303, the preview image renderer 607 may save the rendering method information of a preview image that can be rendered by the preview image renderer 607 in the shared storage unit 450, for example, when displaying the print setting screen (desktop application UI).

<<Display of Print Setting Screen (Store Application UI)—Sixth Embodiment>>

Figure 32:
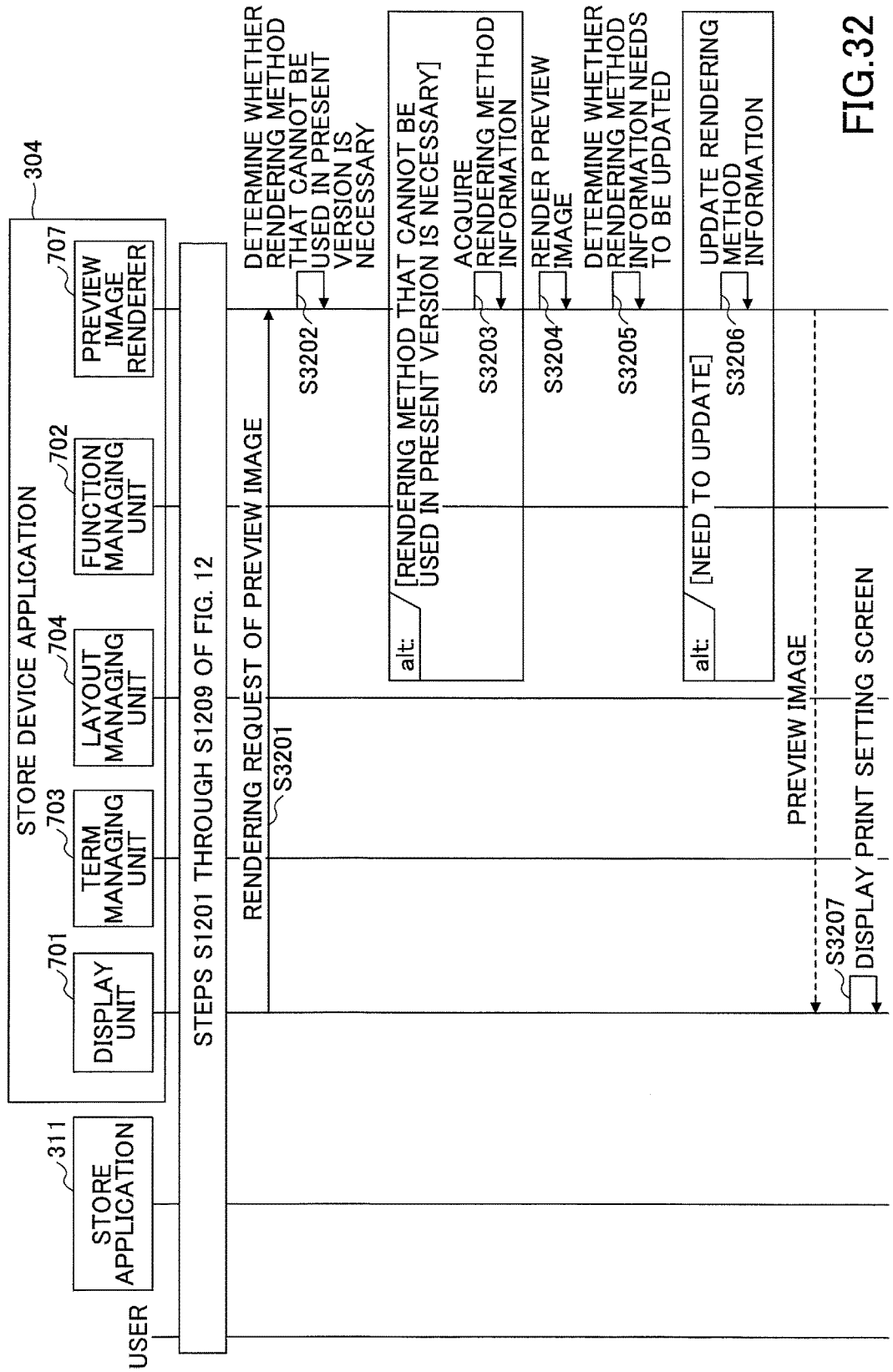
FIG. 32 is a sequence diagram of an example of a process of displaying the print setting screen (store application UI) according to the sixth embodiment of the present invention.

Next, by referring to FIG. 32, a description will be given of a process in which the user of the client device 10 displays a vendor-specific print setting screen (store application UI) including a preview image rendered by the preview image renderer 707, from the store application 311. FIG. 32 is a sequence diagram of an example of a process of displaying the print setting screen (store application UI) according to the sixth embodiment.

Following step S1209, the display unit 701 requests the preview image renderer 707 to render a preview image (step S3201). Note that, the request includes, for example, setting information related to printing that is set by the user (for example, whether to perform "ring binding", paper size, and whether to perform allocation, etc.).

Upon receiving the request to render a preview image, the preview image renderer 707 determines whether rendering method information, which cannot be used with the present version, is necessary for rendering the preview image (step S3202). That is, the preview image renderer 707 determines whether rendering method information, which cannot be used with the present version (the version of the module implementing the preview image renderer 707), is necessary for rendering a preview image based on the setting information included in the rendering request.

For example, it is assumed that the version of the module implementing the preview image renderer 707 is "ver. 1.0", and the rendering method information necessary for rendering the preview image based on the setting information is "rendering method 4". In this case, the rendering method information "rendering method 4" can be used with the version of the module "ver. 1.1", and therefore in the module of version "ver. 1.0", the rendering method information "rendering method 4" is not implemented. Thus, in this case, the preview image renderer 707 determines that it is necessary to have the rendering method information that cannot be used with the present version "ver. 1.0", in order to render a preview image based on the setting information included in the rendering request.

In step S3202, when it is determined that the rendering method information that cannot be used in the present version is necessary, the preview image renderer 707 acquires the necessary rendering method information from the shared storage unit 450 (step S3203).

That is, for example, it is assumed that the version of the module implementing the preview image renderer 707 is "ver. 1.0", and the rendering method information "rendering method 4" (for example, rendering method information for "ring binding") is necessary for rendering a preview image based on the setting information. In this case, the preview image renderer 707 acquires the rendering method information "rendering method 4" from the rendering method information 4100 stored in the shared storage unit 450.

In this way, when the preview image renderer 707 cannot render the preview image with the version of the module that implements the preview image renderer 707, the preview image renderer 707 acquires the rendering method information necessary for rendering the preview image from the shared storage unit 450.

Next, the preview image renderer 707 renders a preview image based on the setting information according to the rendering method information (step S3204).

Next, the preview image renderer 707 determines whether the rendering method information 4100 stored in the shared storage unit 450 needs to be updated (step S3205). That is, the preview image renderer 707 determines whether there is any rendering method information that is not stored in the shared storage unit 450, among the rendering method information of the preview image that can be rendered by the preview image renderer 707.

In step S3205, when it is determined that the rendering method information 4100 stored in the shared storage unit 450 needs to be updated, the preview image renderer 707 updates the rendering method information 4100 stored in the shared storage unit 450 (Step S3206).

That is, for example, it is assumed that the version of the module that implements the preview image renderer 707 is "ver. 1.2", and the preview image renderer 707 is able to use the rendering method information "rendering method 5" (for example, rendering method information of "single-sleeve folding"). In this case, the preview image renderer 707 adds the rendering method information "rendering method 5" that can be used with "ver. 1.2", to the rendering method information 4100 stored in the shared storage unit 450.

Then, the preview image renderer 707 returns the preview image rendered in step S3204, to the display unit 701.

Next, upon receiving the term information, the layout information, the function information, and the preview image, the display unit 701 displays the vendor-specific print setting screen (store application UI) including the preview image, based on these pieces of information (step S3207). Thus, the vendor-specific print setting screen (store application UI) including the preview image rendered by the preview image renderer 707, is displayed.

<<Display of Print Setting Screen (Desktop Application UI)—Sixth Embodiment>>

Figure 33:
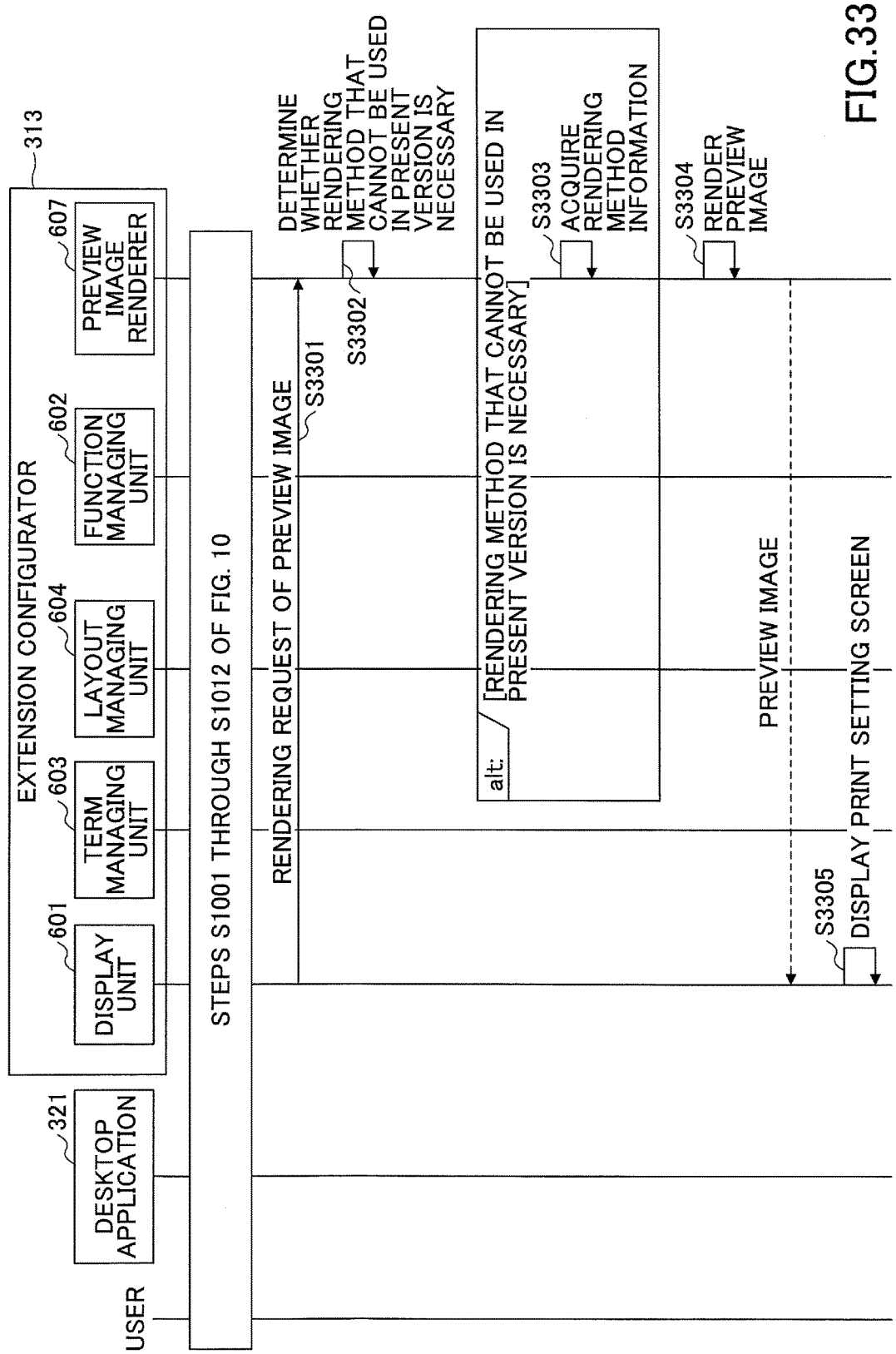
FIG. 33 is a sequence diagram of an example of a process of displaying the print setting screen (desktop application UI) according to the sixth embodiment of the present invention.

Next, by referring to FIG. 33, a description will be given of a process in which the user of the client device 10 displays the vendor-specific print setting screen (desktop UI) including the preview image rendered by the preview image renderer 607, from the desktop application 321. FIG. 33 is a sequence diagram of an example of a process of displaying the print setting screen (desktop application UI).

Following step S1012, the display unit 601 requests the preview image renderer 607 to render a preview image (step S3301). Note that the request includes, for example, setting information related to printing set by the user.

Upon receiving the request to render a preview image, the preview image renderer 607 determines whether rendering method information, which cannot be used with the present version, is necessary for rendering the preview image (step S3302). That is, the preview image renderer 607 determines whether rendering method information, which cannot be used with the present version (the version of the module implementing the preview image renderer 607), is necessary for rendering a preview image based on the setting information included in the rendering request.

In step S3302, when it is determined that the rendering method information that cannot be used with the present version is necessary, the preview image renderer 607 acquires the necessary rendering method information from the shared storage unit 450 (step S3303).

Next, the preview image renderer 607 renders a preview image based on the setting information according to the rendering method information (step S3304).

Then, the preview image renderer 607 returns the preview image rendered in step S3304, to the display unit 601.

Next, upon receiving the term information, the layout information, the function information, and the preview image, the display unit 601 displays the vendor-specific print setting screen (desktop UI) including the preview image, based on these pieces of information (step S3305). Thus, the vendor-specific print setting screen (desktop UI) including the preview image rendered by the preview image renderer 607, is displayed.

As described above, in the client device 10 according to the sixth embodiment, even when the extension configurator 313 and the store device application 304 include modules of different versions for implementing a predetermined function (for example, rendering a preview image) by the same logic, the same function can be provided with these modules of different versions.

In the sixth embodiment, the rendering of a preview image has been described as an example as the predetermined function; however, the present embodiment is not limited as such. For example, in addition to the rendering of a preview image, the predetermined functions include various functions related to printing, such as stapling and punching that are implemented by the same logic in the extension setting unit 313 and the store device application 304.

According to one embodiment of the present invention, the sharing of functional settings between different print setting screens, is enabled.

The information processing apparatus, the information processing method, and the information processing system are not limited to the specific embodiments described in the detailed description, and variations and modifications may be made without departing from the spirit and scope of the present invention.

What is claimed is:

1. An information processing apparatus comprising a processor, in communication with a memory, executing a process including:
    executing a first program configured to display a first print setting screen on a display device; and
    executing a second program configured to display a second print setting screen that is different from the first print setting screen, on the display device, wherein
    the executing of the first program includes:
        displaying the first print setting screen;
        accepting a first changing operation of changing setting information of a function relating to a printing operation, at the displayed first print setting screen, the first changing operation being input via a user interface; and
        storing the changed setting information in a shared storage that is accessible by the second program, in response to accepting the first changing operation, and wherein
    the executing of the second program includes:
        acquiring the setting information from the shared storage; and
        displaying the second print setting screen based on the acquired setting information, such that the first changing operation performed at the first print setting screen is applied to the second print setting screen,
    wherein the executing of the first program includes acquiring layout information from a layout information storage and storing the acquired layout information in the shared storage, the layout information storage storing the layout information defining a layout of Graphical User Interface (GUI) parts in the first print setting screen,
    the executing of the second program includes acquiring the layout information from the shared storage,
    the executing of the first program includes displaying the first print setting screen based on the layout information acquired by the first program, and
    the executing of the second program includes displaying the second print setting screen based on the layout information acquired by the second program.

2. The information processing apparatus according to claim 1, wherein
    the executing of the first program includes
        acquiring the setting information from a setting information storage configured to store the setting information of the function relating to the printing operation, and
        displaying the first print setting screen based on the setting information acquired from the setting information storage.

3. The information processing apparatus according to claim 2, wherein the setting information storage is inaccessible by the second program.

4. The information processing apparatus according to claim 2, wherein the executing of the first program includes storing the setting information changed according to the first changing operation, in the setting information storage and in the shared storage, upon accepting the first changing operation.

5. The information processing apparatus according to claim 2, wherein
the executing of the second program includes
accepting a second changing operation for changing the setting information at the displayed second print setting screen, and
storing, in the shared storage, the setting information changed according to the second changing operation, upon accepting the second changing operation, and
the executing of the first program includes acquiring the setting information from the setting information storage, and acquiring the changed setting information stored in the shared storage.

6. The information processing apparatus according to claim 2, wherein
the executing of the first program includes generating first image data of an image to be displayed in the first print setting screen, based on the setting information acquired by the first program,
the executing of the second program includes generating second image data of an image to be displayed in the second print setting screen, based on the setting information acquired by the second program,
the executing of the first program includes displaying the first print setting screen based on the generated first image data, and
the executing of the second program includes displaying the second print setting screen based on the generated second image data.

7. The information processing apparatus according to claim 1, wherein
the executing of the first program includes acquiring term information from a term information storage and storing the acquired term information in the shared storage, the term information storage storing the term information defining a display name of a setting item that can be set at the first print setting screen,
the executing of the second program includes acquiring the term information from the shared storage,
the executing of the first program includes displaying the first print setting screen based on the term information acquired by the first program, and
the executing of the second program includes displaying the second print setting screen based on the term information acquired by the second program.

8. The information processing apparatus according to claim 7, wherein at least one of the layout information storage and the term information storage is inaccessible by the second program.

9. The information processing apparatus according to claim 1, wherein
the executing of the first program includes converting third image data of an image, which is specified by a user in the first print setting screen, into a predetermined data format, and storing the converted third image data in the shared storage,
the executing of the second program includes acquiring the converted third image data from the shared storage, and converting the converted third image data back to an original data format, and
the executing of the second program includes displaying the second print setting screen based on the third image data acquired by the second program.

10. The information processing apparatus according to claim 1, wherein
the first program is a printer extension, and
the second program is a store device application.

11. The information processing apparatus according to claim 1, wherein the shared storage is a UserPropertyBag or a QueuePropertyBag.

12. The information processing apparatus according to claim 1, wherein the setting information includes a setting item of at least one print setting and a setting value of the at least one print setting.

13. The information processing apparatus according to claim 1, wherein
the executing of the first program includes executing a third program configured to provide the function relating to the printing operation,
the executing of the second program includes executing a fourth program configured to provide the function by the same logic as the first program,
the executing of the third program includes storing, in the shared storage, execution method information, in which a parameter indicating a method of executing the function is defined, and
the executing of the fourth program includes acquiring the execution method information from the shared storage, according to a version of the fourth program, upon accepting an execution request to execute the function.

14. The information processing apparatus according to claim 13, wherein the executing of the fourth program includes acquiring, from the shared storage, the execution method information for executing the function, upon detecting that the function relating to the execution request cannot be executed by a version of the third program.

15. The information processing apparatus according to claim 13, wherein
the executing of the third program includes storing the execution method information, in which the parameter indicating the method of executing the function is defined, in the shared storage in association with a version of the third program and the fourth program by which the function is executable, and
the executing of the fourth program includes acquiring the execution method information from the shared storage, upon detecting that the version, which is associated with the execution method information for executing the function relating to the execution request, is newer than a version of the third program.

16. The information processing apparatus according to claim 13, wherein the function is a rendering function for rendering a preview image.

17. An information processing method executed by a computer, in an information processing apparatus to execute a first program configured to display a first print setting screen on a display device, and a second program configured to display a second print setting screen that is different from the first print setting screen, on the display device, the information processing method comprising:
displaying the first print setting screen;
accepting a first changing operation of changing setting information of a function relating to a printing operation, at the displayed first print setting screen, the first changing operation being input via a user interface;
storing the changed setting information in a shared storage that is accessible by the second program, in response to accepting the first changing operation;
acquiring the setting information from the shared storage; and displaying the second print setting screen based on the acquired setting information, such that the first changing operation performed at the first print setting screen is applied to the second print setting screen, wherein the method further comprises:

executing the first program so as to acquire layout information from a layout information storage and store the acquired layout information in the shared storage, the layout information storage storing the layout information defining a layout of Graphical User Interface (GUI) parts in the first print setting screen, executing the second program so as to acquire the layout information from the shared storage, executing the first program so as to display the first print setting screen based on the layout information acquired by the first program, and executing the second program so as to display the second print setting screen based on the layout information acquired by the second program.

18. An information processing system comprising:

information processing apparatus including a processor, in communication with a memory, executing a process including:

executing a first program configured to display a first print setting screen on a display device;

executing a second program configured to display a second print setting screen that is different from the first print setting screen, on the display device; and sending data of a print target corresponding to a printing operation relating to at least one of the first print setting screen and the second print setting screen, wherein the executing of the first program includes:

displaying the first print setting screen;

accepting a first changing operation of changing setting information of a function relating to the printing operation, at the displayed first print setting screen, the first changing operation being input via a user interface;

storing the changed setting information in a shared storage that is accessible by the second program, in response to accepting the first changing operation, acquiring layout information from a layout information storage and storing the acquired layout information in the shared storage, the layout information storage storing the layout information defining a layout of Graphical User Interface (GUI) parts in the first print setting screen, and display the first print setting screen based on the layout information acquired by the first program, wherein the executing of the second program includes:

acquiring the setting information from the shared storage; and displaying the second print setting screen based on the acquired setting information, such that the first changing operation performed at the first print setting screen is applied to the second print setting screen, wherein the information processing system further comprises:

an image forming apparatus including a processor, in communication with a memory, executing a process including:

receiving the data of the print target from the information processing apparatus; and forming an image based on the received data, executing the second program so as to acquire the layout information from the shared storage, and display the second print setting screen based on the layout information acquired by the second program.

* * * * *

UNITED STATES PATENT AND TRADEMARK OFFICE
CERTIFICATE OF CORRECTION

PATENT NO. : 10,104,249 B2
APPLICATION NO. : 15/702157
DATED : October 16, 2018
INVENTOR(S) : Masahide Nishio It is certified that error appears in the above-identified patent and that said Letters Patent is hereby corrected as shown below:

On the Title Page

Item (54) and in the Specification, Column 1, Lines 1-6, please correct the Title of Invention:
INFORMATION PROCESSING APPARATUS USING A PLURALITY OF SETTING SCREENS, INFORMATION PROCESSING METHOD USING THE SAME, AND INFORMATION PROCESSING SYSTEM USING THE SAME To:
INFORMATION PROCESSING APPARATUS USING A PLURALITY OF PRINT SETTING SCREENS, INFORMATION PROCESSING METHOD USING THE SAME, AND INFORMATION PROCESSING SYSTEM USING THE SAME Signed and Sealed this
Twenty-second Day of January, 2019

Andrei Iancu
*Director of the United States Patent and Trademark Office*